US012687514B2

(12) United States Patent
Han et al.

(10) Patent No.: US 12,687,514 B2
(45) Date of Patent: Jul. 21, 2026

(54) ARCHITECTURES AND METHODS FOR ELECTROCHEMICAL NEUROMODULATION

(71) Applicants: Massachusetts Institute of Technology, Cambridge, MA (US); Charles Stark Draper Laboratory, Inc., Cambridge, MA (US)

(72) Inventors: Jongyoon Han, Bedford, MA (US); Daniel Freeman, Reading, MA (US); Matthew Flavin, Downers Grove, IL (US)

(73) Assignees: Massachusetts Institute of Technology, Cambridge, MA (US); Charles Stark Draper Laboratory, Inc., Cambridge, MA (US)

( * ) Notice: Subject to any disclaimer, the term of this patent is extended or adjusted under 35 U.S.C. 154(b) by 855 days.

(21) Appl. No.: 17/741,921

(22) Filed: May 11, 2022

(65) Prior Publication Data

US 2022/0381723 A1 Dec. 1, 2022

Related U.S. Application Data

(60) Provisional application No. 63/186,946, filed on May 11, 2021.

(51) Int. Cl.
*G01N 27/333* (2006.01)

(52) U.S. Cl.
CPC ............................... *G01N 27/3335* (2013.01)

(58) Field of Classification Search
CPC .. A61B 2018/0044; A61B 2018/00434; A61B 8/0808; A61B 5/686; A61B 5/4836; A61B 5/388; A61B 5/24; G01N 27/3335; A61N 1/0551; A61N 1/36003; A61N 1/3605; A61N 1/36139; A61N 1/0531; A61N 1/0529; A61N 1/0556
See application file for complete search history.

(56) References Cited

U.S. PATENT DOCUMENTS

2011/0251652 A1* 10/2011 Han ..................... A61N 1/3605
607/2
2013/0030510 A1 1/2013 Han et al.

OTHER PUBLICATIONS

Yong-Ak Song, et al., "Electrochemical activation and inhibition of neuromuscular systems through modulation of ion concentrations with ion-selective membranes," 10 Nature Materials 980-986 (2011).
(Continued)

*Primary Examiner* — Melanie R Tyson
*Assistant Examiner* — Melissa A Hoban
(74) *Attorney, Agent, or Firm* — Modern Times Legal; Robert J. Sayre

(57) ABSTRACT

A prosthetic device includes a closed loop system for maintaining a predetermined concentration of a target ion in a region in proximity to a cell, such as a nerve cell. The device includes a controller and an ion-selective electrode assembly operatively connected to the controller, wherein the ion-selective electrode configuration is configured to sense the concentration of the target ion by potentiometric measurement and to convey the concentration to the controller. The controller is configured to modulate the current to the ion-selective electrode assembly based on the concentration of the target ion to control the concentration of the target ion so as to maintain the predetermined concentration of the target ion.

28 Claims, 10 Drawing Sheets

(56)                    References Cited

OTHER PUBLICATIONS

Erik O. Gabrielsson, et al., "A Four-Diode Full-Wave Ionic Current
Rectifier Based on Bipolar Membranes: Overcoming the Limit of
Electrode Capacity," 26 Advanced Materials 5143-5147 (2014).

* cited by examiner

Phase I (charging)

Phase II (enriching)

Axis of radial symmetry $V = 0$
$c_i = c_i^0$ 0.1 mm $n \cdot N_i = n \cdot J(T_i / z_i F)$ 0.8 mm 8 mm 0.2    0.8    1.4    2

$[Ca^{2+}]$ (mM)

ARCHITECTURES AND METHODS FOR ELECTROCHEMICAL NEUROMODULATION

RELATED APPLICATION

Priority is claimed to U.S. Provisional Application No. 63/186,946, filed 11 May 2021, the teachings of which are incorporated herein by reference.

BACKGROUND

The discussion of the background state of the art, below, may reflect hindsight gained from the disclosed invention(s); and these characterizations are not necessarily admitted to be prior art.

Conventional functional electrical stimulation (FES) aims to restore functional motor activity for patients with disabilities resulting from spinal cord injury (SCI) or neurological disorders by artificially stimulating the nerve. Among the many technical limitations of FES-related intervention in neurological diseases, a drawback is the lack of an effective, implantable technique for nerve signal simulation and conduction block for suppressing unwanted nerve signals with a high degree of control and compact size.

Technological advances in the efficacy and precision of neuro-modulation have significant commercial value. Previously, we have disclosed the invention of a novel technique for manipulating neural activity via "electrochemical neuro-modulation". Y.-A. Song, et al., "Electrochemical activation and inhibition of neuromuscular systems through modulation of ion concentrations with ion-selective membranes," 10 Nature Materials, 980-986 (2011) and US Patent Publication No. 2013/0030510 A1, which are incorporated herein by reference. Devices with polarizing electrodes modified with ion-selective materials can selectively enrich or deplete the concentration of a targeted ion in a constrained volume around the electrode. By driving current across a membrane filter with single-ion transport selectivity, one can modulate the concentration of a selected ion in the local volume of the membrane—enriching or depleting it depending on the polarity of the current. Such devices are particularly suited for delivering charged molecules having selective filters, including monatomic ions, such as $Ca^{2+}$, $Na^+$, $K^+$, $H^+$, $Mg^{2+}$, and Cl. However, precise control of ion delivery is required.

Ion-selective-membrane (ISM) electrodes arose early in the 20th century the discovered was made that the potential across a doped glass membrane varied directly with the difference in pH on both sides. Today, liquid membranes are commonly used for ion concentration sensing applications. Ionophores give the membrane selectivity towards a particular ion by binding to the target ion with high affinity.

More recently, a new generation of ISM-based sensing modalities (or sensors) has emerged. Instead of simply measuring the potential across the ISM in a zero-current mode, the membrane is electrically polarized and are referred to as "dynamic." Such ISM sensors are based on amperometric modalities, such as cyclic and stripping voltammetry. This type of operation has been used for the implementation of liquid-membrane scanning electrochemical microscopy (SECM) probes which provide surface images of ionic species. Another dynamic technique that has been reported is ISM coulometry. Here, the concentration of a particular target species is exhaustively depleted via an ISM electrode up to the limiting current value. From this procedure, the amount of the target ion species can be determined avoiding the need to repeat calibration. Lastly, sensors based on techniques such as pulsed-current chronopotentiometry and flash chronopotentiometry offer various improvements, such as lower detection limits and the ability to measure total (both free and ionophore-bound ion) concentration. These sensors operate under galvanostatic control, and the degree of concentration depletion or enrichment is determined by measuring the potential response. These dynamic modes of operation have implications not only for concentration sensing but also for selective filtering applications.

SUMMARY

A prosthetic device and a method of modulating neural activity using the prosthetic device are described herein, where various embodiments of the device and methods may include some or all of the elements, features and steps described below.

A prosthetic device includes a closed loop system for maintaining a predetermined concentration of a target ion in a region in proximity to a cell, such as a nerve cell. The device includes a controller and an ion-selective electrode assembly operatively connected to the controller, wherein the ion-selective electrode configuration is configured to sense the concentration of the target ion by potentiometric measurement and to convey the concentration to the controller. The controller is configured to modulate the current to the ion-selective electrode assembly based on the concentration of the target ion to control the concentration of the target ion so as to maintain the predetermined concentration of the target ion.

A method of modulating neural activity in a subject in need thereof includes implanting the above-described ion-selective electrode assembly of the prosthetic device sufficiently proximate to a nerve cell in a subject to deliver electrical current to the nerve cell and applying an electric current through the ion-selective electrode assembly to deliver that electrical current to the nerve cell.

The device and methods described herein can provide improved concentration control to select, control, and/or maintain a solute concentration, for example, in a neural prosthetic device. Concentration modulation can be performed by forcing electrical current across an ion-selective membrane that acts as a filter for a targeted ion. However, instead of enriching or depleting concentration to an arbitrary extent, this technology can maintain a prescribed level of target ion. We describe three variations of this approach: (1) membrane transfer selectivity manipulation, (2) simultaneous sensing and modulating with singular ion-selective-membrane (ISM) electrode, and (3) simultaneous sensing and modulating with discrete, co-localized ISM electrodes.

In the first variation (i.e., membrane transfer selectivity manipulation), we take advantage of the fact that the magnitude of concentration modulation and the transfer selectivity of the membrane are co-dependent. That is, for a sufficiently large depletion of ions, the membrane loses transfer selectivity, which, in turn, limits the rate of ion depletion. As a result, ion concentration can be maintained within a narrow range of values independent of changes in the bulk concentration of that ion and variations in applied current. The prescribed concentration level, in this case, is tuned by modifying the composition of the membrane. Thus, the intended concentration level can be hard-wired into the device.

The second and third variations use a closed-loop system to maintain concentrations. In the second case, our feedback system is constructed from a singular ISM electrode that both senses (via potentiometric measurement) and modulates (via applied electric field) the concentration of a target ion. This device uses a mathematical model to determine the magnitude of electric field necessary for maintaining a particular concentration. Using the simultaneous concentration measurements, the device updates the model continuously to reflect interstitial transport characteristics that change unpredictably over time. Rather than having the concentration hard-wired into the device, one can set the desired concentration of this system at will by controlling the electric field.

The basic operating principle of the third variation of concentration control is the same as that of the second variation—i.e., a prescribed concentration is maintained using a closed-loop feedback system. However, in this case, the functions of sensing and modulating are separated between two or more ISM electrodes—one current-controlled electrode is used to modulate and another passive electrode is used to sense. These electrodes are located sufficiently close to each other such that that the sensing electrode can assess changes produced by the modulating electrode. Compared to the second version, this system will be able to control concentration with more accuracy. However, fabrication constraints will increase the minimum dimensions of this electrode system.

An electrode that can apply direct and prolonged current has important technological implications. The finite charge injection capacity (CIC) of electrodes significantly limits the application of processes, such as electrocoagulation, electroosmosis, and electroporation. This limitation also prevents certain types of neuro-modulation, such as DC nerve blocking, as described in N. Bhadra and K. L. Kilgore, "Direct current electrical conduction block of peripheral nerve," 12 IEEE Transactions on Neural Systems and Rehabilitation Engineering 313-324 (2004). Further, CIC severely constrains the operation of ion-selective-membrane (ISM) electrodes for electrochemical modulation—applications of which are outlined in the discussion of the commercial and therapeutic significance of electrochemical concentration control. Thus, these approaches for electrochemical rectification hold significant potential for commercial value.

where the call-out, below, shows the relative magnitudes of several key boundary processes that give rise to selective transport, normalized to their maximum values within the depicted region.

Figures 32, 33, 34, 35:
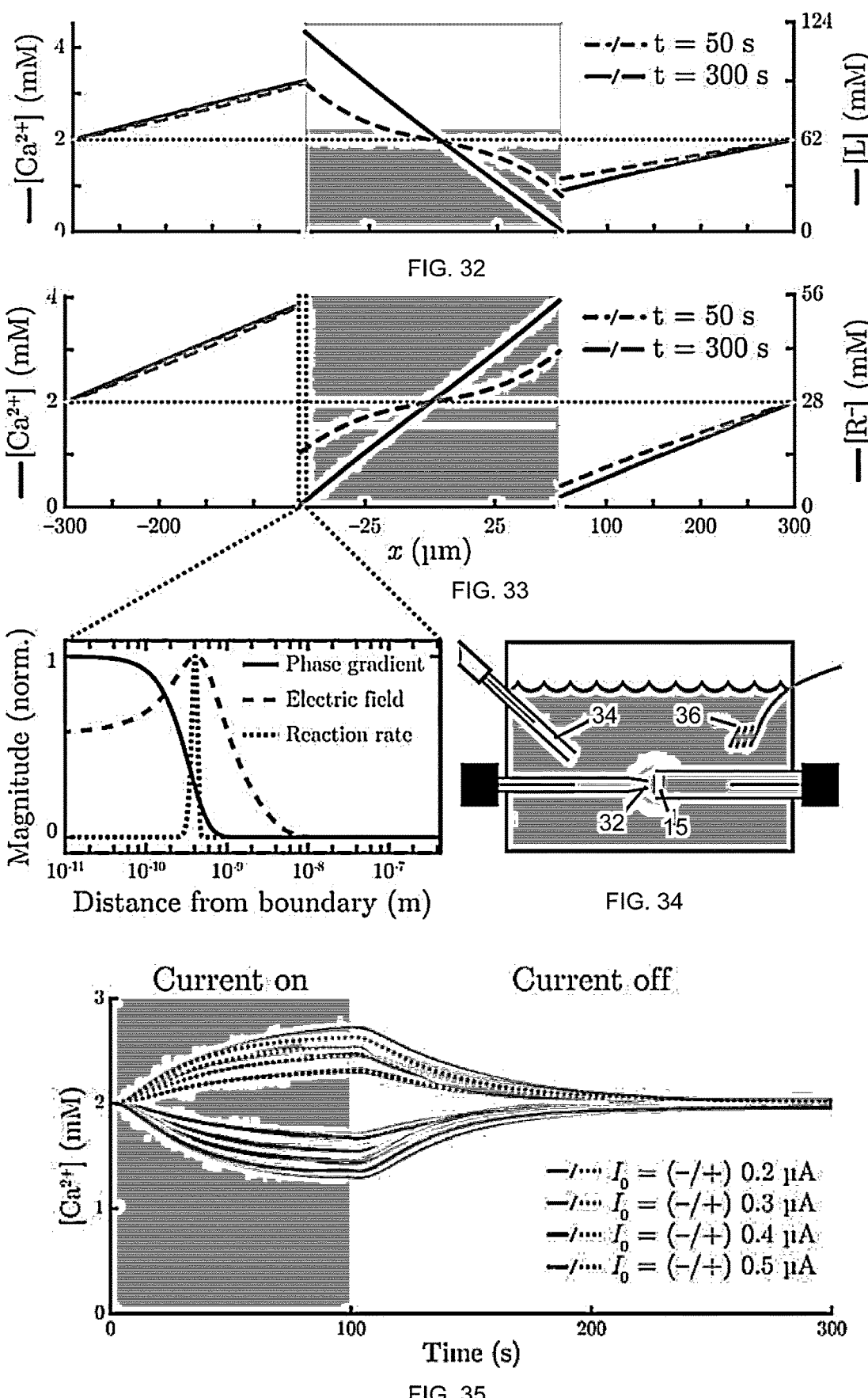
FIG. 32 is a plot of simulated concentration profiles of aqueous and membrane-confined solutes during the application of constant current, given conditions that give rise to the exhaustive depletion of unbound carrier within the membrane (default model parameters, J=−1 A/m²)
FIG. 33 is a plot of simulated concentration profiles of aqueous and membrane-confined solutes during the application of constant current, given conditions that give rise to the exhaustive depletion of lipophilic counter-ion within the membrane $$D_L^{(org)} = 2 \times 10^{-11} \text{ m}^2/\text{s}, J = -1.5 \text{ } A/\text{m}^2),$$

FIG. 34 is a schematic illustration of experimental setup, where the reference and counter electrodes are denoted as RE and CE, respectively.

FIG. 35 is a plot of the temporal profile of the $Ca^{2+}$ concentration during applied current and, subsequently, its return to equilibrium measured 100 µm from the surface of the driver membrane.

Figures 36, 37, 38, 39, 40:
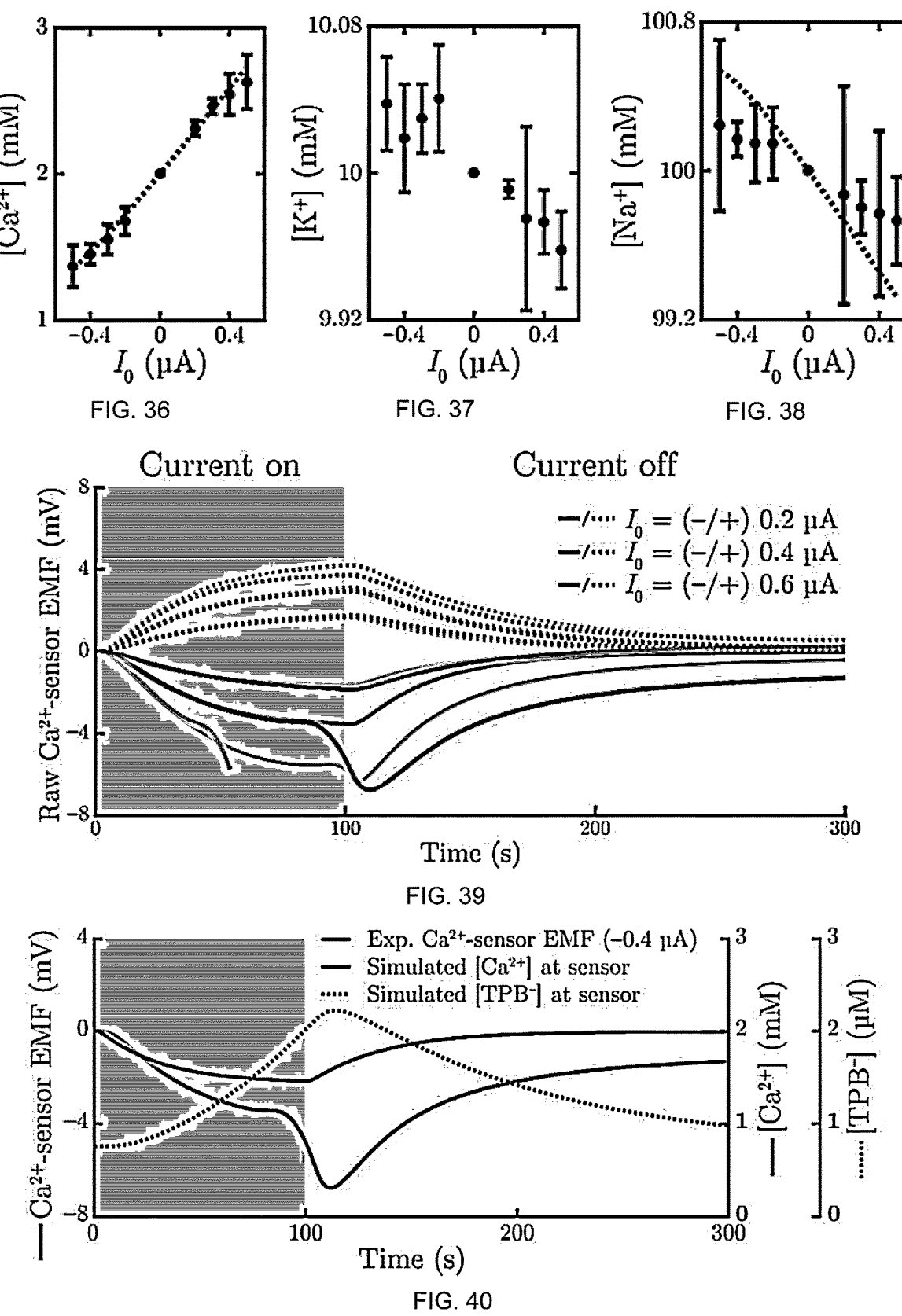

FIGS. 36-38 plot the final concentrations of $Ca^{2+}$, $K^+$, and $Na^+$ measured at 100 seconds, where the dotted line shows the concentrations simulated under the Nernst-Planck-Poisson transport model.

FIG. 39 plots raw sensor readings from the $Ca^{2+}$-selective sensor taken for a range of currents, demonstrating conditions that give rise to tetraphenylborate leaching. The solid lines show measurements taken with 10 mM $K^+$ present, and the faded lines show measurements taken with 0 mM KCl.

FIG. 40 plots raw sensor readings from the $Ca^{2+}$-selective sensor taken for a current of −0.4 µA, with the numerical solution describing the underlying processes giving rise to its trend.

Figure 41:
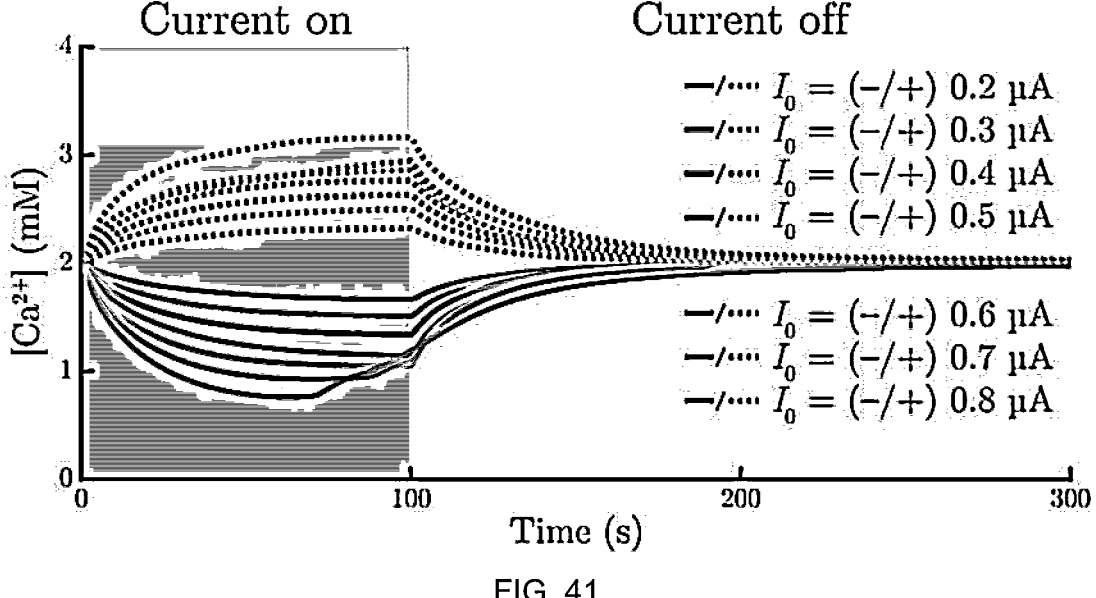

FIG. 41 plots the direct concentration measurements of $Ca^{2+}$ concentration measured 100 µm from the surface of the driver membrane, which contained tetrakis(4-chloro)phenylborate.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

A method of modulating physiological chemical concentrations is through systemic administration of pharmaceutical agents. However, the effects of this type of manipulation cannot be controlled spatially or temporally with any precision. Additionally, this approach has to deal with systemic barriers and buffers. Local administration through injection solves some of these problems, but this is not feasible outside of the clinic. Previous devices have attempted localized chemical modulation using micro electromechanical systems (MEMS) reservoirs that inject ions by iontophoresis, but they are prohibitively bulky and have finite supplies of ions. In our device, the ISM acts as a filter for the targeted ion. As such, it can provide localized chemical modulation without the need of a reservoir.

Any charged molecule for which an ionophore is available can be targeted with the devices described herein. With ionophores corresponding to more than 91 ions being available, the device is capable of manipulating neural activity in a multitude of ways. In our studies, we have confirmed the effects of $K^+$ and $Ca^{2+}$ modulation, which are to block and to facilitate signal propagation, respectively. Blocking is currently possible with commercial devices that use high-frequency alternating current. However, blocking via the technique described herein can be performed using a lower amplitude of current, prolonging the lifetime of the electrode. We know of no other device that is capable of nerve facilitation.

While most emerging neuro-modulation modalities require lengthy regulatory pathways, our device would likely be able to proceed more readily. The ISM itself is known to be biocompatible, and it has been used clinically for ion-sensing applications. Furthermore, ISM deposition is only a minor modification of the standard electrical-stimulation platform used in established clinical modalities such as deep brain stimulation (DBS), vagus nerve stimulation (VNS), and electro-acoustic stimulation (EAS). This technique can, therefore, be easily translatable to long-term implants.

Commercially, this concentration-control system has a strong potential for use as a therapeutic solution for neurological and psychiatric disorders. Many different types of stimulation are possible using the principles of this device. As examples, we will focus here on the potential therapeutic applications of $K^+$ and $Ca^{2+}$ modulation.

A $K^+$-selective device is able to modulate the interstitial $K^+$ concentration, blocking nerve propagation. Clinically, this modulation can be used to block aberrantly firing nerves characteristic of neuropathic pain disorders. In trigeminal neuralgia, pathological firing causes such excruciating pain that it has been nicknamed the "suicide disease." However, this pain is short-lived, and permanent desensitization has undesirable consequence. Thus, an ideal solution to this condition would be one that the patient could control on-demand. This is easily achievable with the ion-selective-membrane (ISM)-based device, described herein.

On the other hand, a $Ca^{2+}$-selective device is capable of enhancing neuronal excitability. Because ion concentration polarization (ICP) is more localized than electrical stimulation, it can be used in coordination with electrical stimulation to produce a more focal activation of neurons, which addresses one of the major limitations of electrical stimulation. The electrode size of the most commonly used dodecylbenzenesulfonic acid (DBS) system, the Medtronic 3387, is 1.3-mm in diameter. Meanwhile, it has been estimated that the volume of excited tissue in a typical Parkinson's patient with this device extends out hundreds of cubic millimeters. Indiscriminate effects, such as these, have been thought to contribute to side effects such as mood swings and depression.

All electrode materials have a finite charge injection capacity (CIC) that constrains the magnitude and duration of electric current. In a biological system, the consequence of exceeding this capacity is damage to both the electrode and tissue. In order to prevent this damage, stimulation devices use alternating current (AC), which balances the charge entering and leaving the electrode. However, for a number of applications, it would be valuable to use prolonged direct current (DC) rather than AC. We propose the use of electrochemical diodes-made of, for example, bipolar membranes—as a means of converting the safe AC to DC. For example, configurations can include: (1) diode|electrode|diode for general-purpose electrochemical rectification, and (2) diode|electrode|SM for continuous chemical modulation. Each device includes a porous electrode layer (e.g., conducting polymer, porous carbon) sandwiched between two membranes (either electrochemical diode or ISM).

Figures 1, 2, 3, 4, 5:
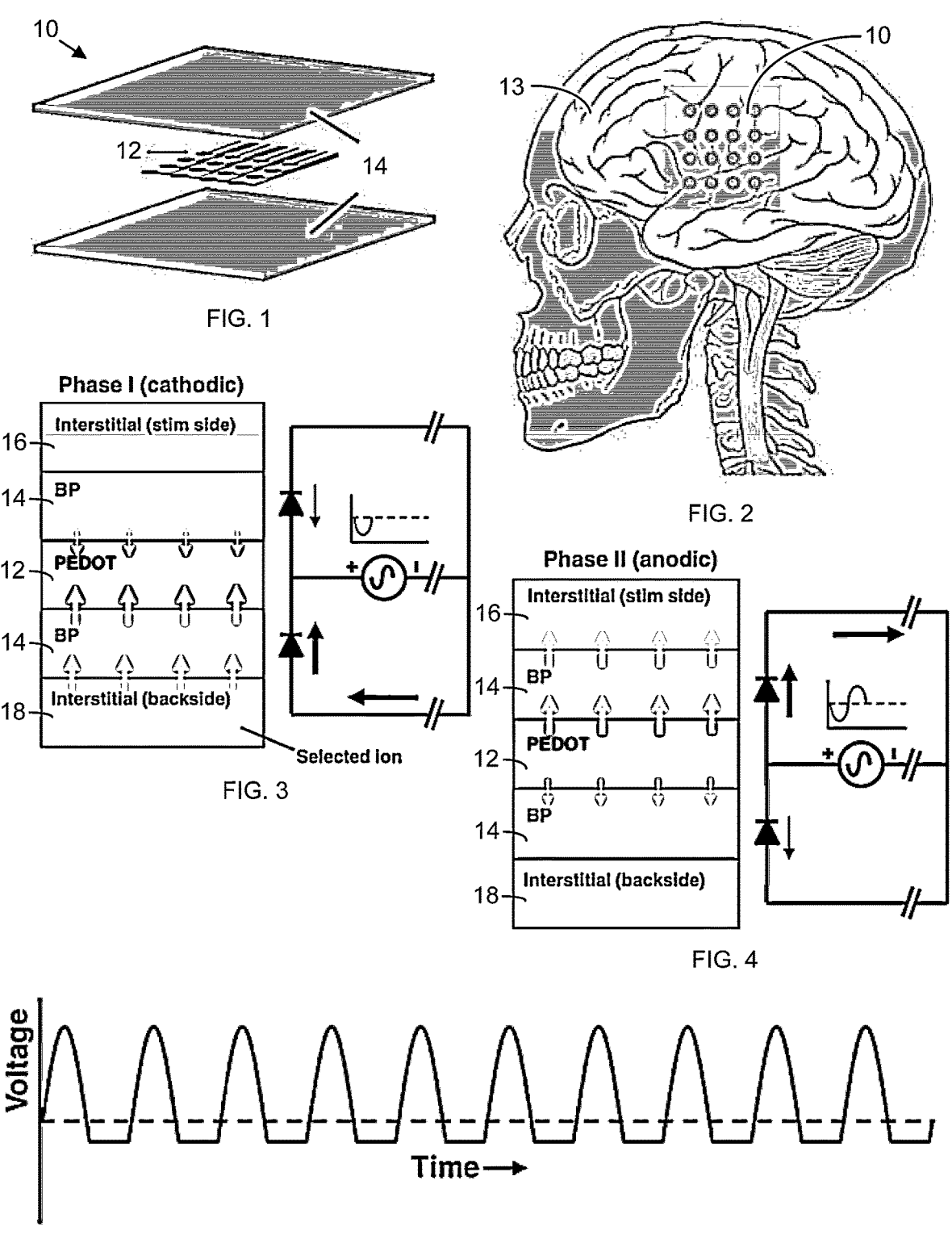
FIG. 1 is an illustration of a prosthetic device including a poly(3,4-ethylenedioxythiophene) polystyrene sulfonate (PEDOT:PSS) (or other conducting polymer) electrode grid sandwiched between two bipolar ion-exchange membrane (ionic diodes).
FIG. 2 is an illustration of the prosthetic device of FIG. 1 implanted proximate a human brain.
FIGS. 3 and 4 illustrate the operating principle of device, wherein the diodes block negative current on the stimulation (stim) side during phase I and permit positive current during phase II.
FIG. 5 plots a waveform of resultant voltage applied on the stimulation side of the device.

In the case of diode|electrode|diode, the device is constructed from a porous electrode sandwiched between two electrochemical diode membranes (shown in FIG. 1). One of these three-layer elements comprises a half-wave rectifier, and multiple elements can be combined into two- and three-phase configurations. This is a general-purpose method of applying charge-balanced direct-current (DC) across an electrode.

A device 10 for applying prolonged current from electrode using biphasic polarization is shown in FIG. 1; and its application to a human brain 13 is shown in FIG. 2. The device 10 can comprise a poly(3,4-ethylenedioxythiophene) polystyrene sulfonate (PEDOT:PSS) (or other conducting polymer) electrode grid 12 sandwiched between two bipolar ion-exchange membranes (ionic diodes) 14, which are in contact with an interstitial stimulation phase 16 and an interstitial backside phase 18. The operating principle of the device is shown in FIGS. 3 and 4, wherein the diode membranes 14 block negative current on the stimulation (stim) side during phase I and permit positive current during phase II. The waveform of the resultant voltage applied on the stim side of the device is shown in FIG. 5.

Figures 6, 7, 8, 9, 10, 11:
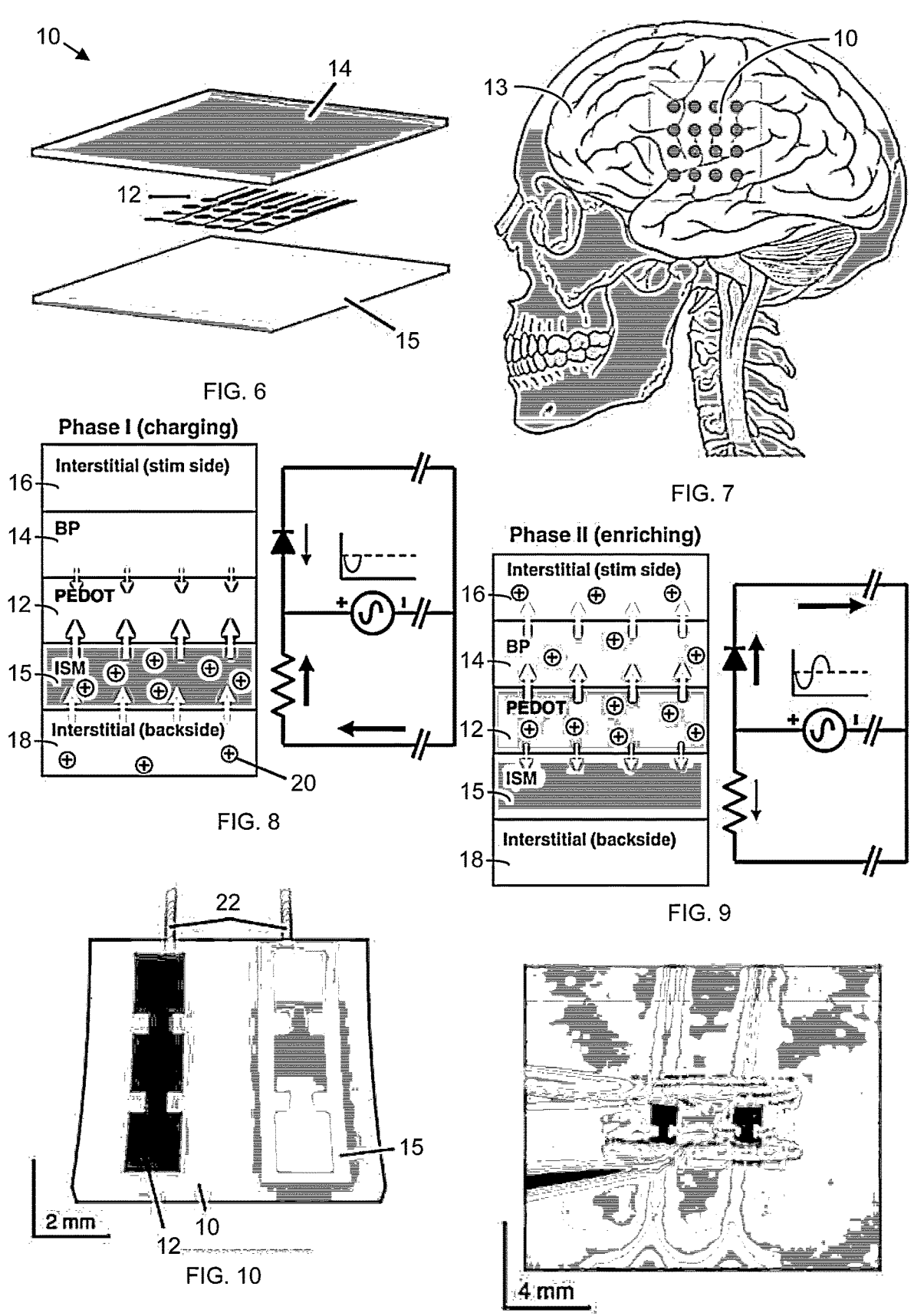
FIG. 6 is an illustration of a prosthetic device for optionally continuous enrichment of targeted ions with a biphasic polarization of electrode material, wherein the device comprises a poly(3,4-ethylenedioxythiophene) polystyrene sulfonate (PEDOT:PSS) (or other conductive polymer) electrode grid sandwiched between two membranes. The top membrane is a bipolar ion-exchange membrane, such as an ionic diode, while the bottom membrane can be an ion-selective membrane (ISM).
FIG. 7 is an illustration of the prosthetic device of FIG. 6 implanted proximate a human brain.
FIGS. 8 and 9 illustrate the operating principle of device, wherein, during phase II (positive current) the selected ion can be expelled from the PEDOT, through the bipolar membrane, and into the interstitial phase of the neural tissue. Effectively, ions are recirculating from the top surface to the back.
FIG. 10 illustrates the inside surface of a device in the form of a cuff that can wrapped around a nerve in vivo.
FIG. 11 is a photographic image of an exemplification of the device.

Another configuration is a modification of our general-purpose rectifier where one of the diodes 14 is replaced by an ion-selective-membrane (ISM) 15 layer (shown in FIG. 6). This approach is specialized for the purpose of modulating (either depleting or enriching) the concentration of ions in a prolonged, sustainable manner.

A device for optionally continuous enrichment of targeted ions with a biphasic polarization of electrode material is shown in FIG. 6. The device comprises a PEDOT:PSS (or other conductive polymer) electrode grid 12 sandwiched between two membranes 14 and 15. The top membrane is a bipolar ion-exchange membrane 14 (such as an ionic diode) while the bottom membrane 15 can be an ISM. Application of this device 10 to a human brain 13 is shown in FIG. 7. During phase I (negative current), as shown in FIG. 8, the PEDOT:PSS matrix 12 can be filled with the selected ion 20, which enters from the ion-selective-membrane (ISM) 15. During phase II (positive current), as shown in FIG. 9, the selected ion 20 can be expelled from the PEDOT layer 12, through the bipolar membrane 14, and into the interstitial phase 16 of the neural tissue. Effectively, ions are recirculating from the top surface to the back.

Furthermore, the architecture of their device is bulky and challenging to fabricate. In contrast with previous devices, such as the planar device of E. O. Gabrielsson, et al., "A Four-Diode Full-Wave Ionic Current Rectifier Based on Bipolar Membranes: Overcoming the Limit of Electrode Capacity," 26 Advanced Materials 5143-5147 (2014), which uses bipolar membranes to rectify alternating electrode current but which is limited to currents of 500 nA or less, the device described herein can handle higher electric currents of at least 1 milliamp, such as at least about 2 milliamps or at least about 10 milliamps, and is compact; further, its fabrication is simple, as it involves little more than laminating the membrane layers together.

The devices can include one or more ion-selective membranes enabled by electrically controlled local modulation of ion concentrations around a nerve so as to achieve different excitability states of the nerve for electrical stimulation or inhibition of nerve signal propagation. Local modulation is achieved by positioning the nerve in a bipolar perpendicular arrangement so as to modulate the ion concentrations of the one or more ion-selective membranes in situ to change the nerve excitability locally at the site of electrical stimulation or along the nerve for on-demand suppression of nerve propagation.

Single-ion selectivity refers to the ability of the membrane to transport one particular ion within a mixed electrolyte while blocking all others. Ion-exchange membrane systems have demonstrated success in a limited set of applications that require single-ion selectivity. However, ion-exchange membranes only work for these applications when the selected ion is being separated from other ions with different valences—such as $Na^+$ in the presence of $Ca^{2+}$. For the more general case, where the selected ion may need to be separated from ions of identical charge (e.g., $Na^+$ separated from $K^+$), a membrane with such selectivity is created by incorporating labile carriers that reversibly bind with the selected ion. Such a membrane is referred to herein as an ion-selective membrane (ISM).

ISM electrodes arose early in the 20th century when it was discovered that the potential across a doped glass membrane varied directly with the difference in pH on both sides. Today, liquid membranes are commonly used for ion-concentration sensing applications. Ionophores give the membrane selectivity towards a particular ion by binding to the target ion with high affinity.

More recently, a new generation of ISM-based sensing modalities (or sensors) has emerged. Instead of simply measuring the potential across the ISM in a zero-current mode, the membrane is electrically polarized and are referred to as "dynamic." Such ISM sensors are based on amperometric modalities, such as cyclic and stripping voltammetry. This type of operation has been used for the implementation of liquid-membrane scanning electrochemical microscopy (SECM) probes which provide surface images of ionic species. Another dynamic technique that has been reported is ISM coulometry. Here, the concentration of a particular target species is exhaustively depleted via an ISM electrode up to the limiting current value. From this procedure, the amount of the target ion species can be determined avoiding the need to repeat calibration. Lastly, sensors based on techniques, such as pulsed-current chronopotentiometry and flash chronopotentiometry, offer various improvements, such as lower detection limits and the ability to measure total (both free and ionophore-bound ion) concentration. These sensors operate under galvanostatic control, and the degree of concentration depletion or enrichment is determined by measuring the potential response. These dynamic modes of operation have implications not only for concentration sensing but also for selective filtering applications.

Additional exemplifications provide a method of performing active nerve stimulation or inhibition of nerve signal propagation with a device, as described herein. The method can include electrically controlling local modulation of ion concentrations around a nerve so as to achieve different excitability states of the nerve for electrical stimulation or inhibition of nerve-signal propagation. The local modulation can be achieved by positioning the nerve in a bipolar perpendicular arrangement so as to modulate the ion concentrations of the one or more ion-selective membranes in situ to change the nerve excitability locally at the site of electrical stimulation or along the nerve for on-demand suppression of nerve propagation.

The method involves an electrochemical artificial nerve activation and inhibition technique, enabled by electrically controlled local modulation of ion concentrations along the nerve. In this technique, the concentration of ions can be modulated around the nerve in situ in order to achieve different excitability states of the nerve for electrical stimulation, leading to either reduction of electrical threshold by up to approximately 40% or on-demand, reversible inhibition of nerve-signal propagation. This low-threshold electrochemical stimulation technique can be used in an implantable neuroprosthetic device, while the on-demand nerve blocking can offer a novel intervention for chronic disease states caused by uncontrolled nerve activation, such as epilepsy and chronic pain stimuli.

The method provides in-situ control of ion concentration via the ion-selective electrode that can provide a novel mode of local nerve activation (excitatory) and inactivation (inhibitory) in a potentially very low-power, highly miniaturizable and efficacious fashion. This hybrid approach can be tested using a sciatic nerve of an animal (e.g., a frog), attached to the gastrocnemius muscle that can be surgically removed from the animal and placed on top of an array of ion-selective electrodes. Electrodes that are selective for monovalent or divalent salt ions, such as $Na^+$, $K^+$, or $Ca^{+2}$, can be used to actively control the local ion concentration either by decreasing or increasing a specific ion concentration along the sciatic nerve fiber prior to electrical stimulation.

With the modulation of the $K^+$ and $Na^+$ ion concentration, one can reversibly turn "on and off" the signal propagation along the nerve. Additionally, muscle activity (e.g., in terms of force, or other quantitative characteristics from EMO) can be controlled with a higher degree of resolution and/or dynamic range, as a function of the ion-concentration parameter compared with the case of pure electrical stimulation.

The microfabricated implant or device can comprise an array of ion-selective electrodes, for example, in a flexible, biocompatible, plastic chip format for enhanced or inhibited electrical stimulation based on the modulation of ion (e.g., $Ca^{+2}$ and $K^+$ ions) concentrations. A flexible microelectrode array device can include a bio-compatible material that can be used in a planar or folded configuration, where $Ca^{+2}$ and $K^+$ ion-selective membranes are sandwiched between two electrodes. The current applied across the ion-selective membrane can range between (~100 nA to 1 μA or more), such as less than the typical electrical threshold value required for stimulation (~10 μA).

The device can be used in highly space-constrained regions of the body such as the orbit of the eye or the face or in other areas. The device can modulate neural activity, either locally stimulating or blocking nerve impulses by changing the $Ca^{+2}$ or $K^+$ ion concentration in or around the nerve.

Small changes in the potassium-ion concentration can increase the membrane potential from its resting value of −74 mV by 24 mV to reach a neuron firing initiation potential, while other ions, such as $Na^+$ and $Cl^-$ can have no significant impact. In fact, potassium solutions as dilute as 10 mM are commonly used to depolarize neurons. Another ion associated with the excitability of peripheral nerves in neurology, both experimental and clinical, is ionized calcium in a bathing solution.

The generality of this phenomenon has also been observed in the blood of humans with hypoparathyroid disease. A correlation between the measured excitability of the ulnar nerve and the concentration of calcium has been reported. In the lower concentration range, the nerve becomes more excitable and below 0.3 mM, alpha fibers in the sciatic nerve, for example, of frogs may become spontaneously active. If the concentration of calcium chloride is increased to 10-15 mM, then the threshold for excitation increases again.

Based on the role of potassium and calcium ions in neural processes, one can develop a technique to actively modulate the ion concentration around the nerve in a highly local manner, to achieve higher excitability when stimulating the nerve electrically or to initiate an inhibitory state as the opposite effect.

The membranes can be made using an ion-selective agent, such as an ionophore, to increase the permeability of the selective layer in a plasticized amorphous polymer matrix, such as polyvinyl chloride. The device does not require an ion reservoir and thus, can be reservoir-free. The device can be manufactured from biocompatible materials. For example, the device can be manufactured from polydimethylsiloxane (PDMS), polyimides, polycarbonates, nylons, elastomeric and/or thermoplastic materials and combinations thereof, as are typically used in BioMEMS. PDMS/polyimide combinations offer advantages as they are replicable and allow mass manufacturing. Further, the material is flexible and stretchable and can be easily bent to conform to the anatomical spatial constraints.

Porous electrodes can be used, wherein the pore sizes can be, for example between 1-30 μm.

Figures 12, 13, 14, 15:
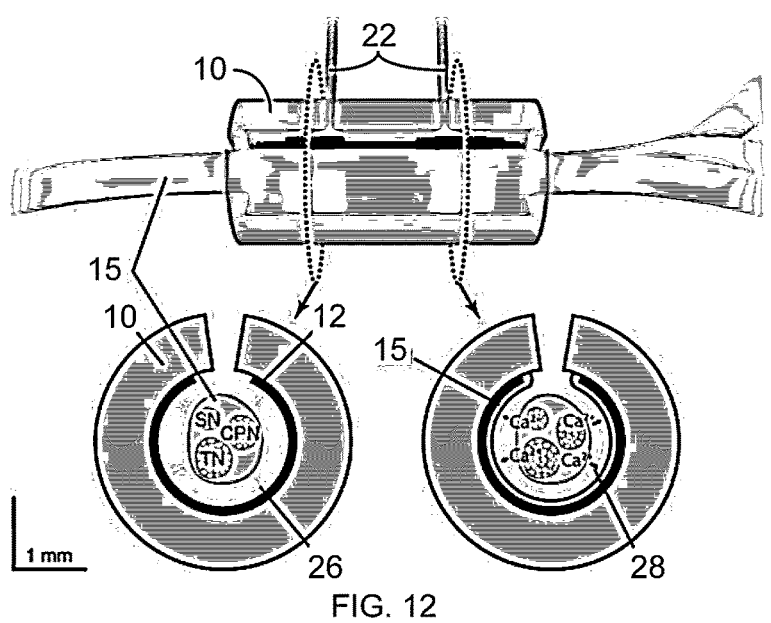
FIG. 12 is an illustration of the cuff implanted on a sciatic nerve, including sectional views.
FIG. 13 illustrates the 2-D axisymmetric geometry of a physicochemical transport model of ions within an ISM cuff electrode.
FIG. 14 is a visualization of a radial slice of $Ca^{2+}$ concentration after applying $-20$ μA for 300 seconds through the ISM-coated electrode, numerically solved using the Nernst-Planck-Poisson equations.
FIG. 15 is a schematic illustration of an experimental setup of a device.

In one embodiment, the device 10 is configured as a cuff (formed, e.g., of silicone) to wrap around a nerve in vivo, as shown in FIGS. 10-12, which show an ion-selective ISM-cuff 10 with a carbon electrode 12 that is selective, in this example, for $Ca^{2+}$. Respective lead wires 22 are electrically coupled with both the electrode 12 and the ion-selective membrane (ISM) 15 An illustration of the inside surface of the cuff 10 is provided in FIG. 10, while a photograph of an exemplification of the device is provided as FIG. 11. Further, an illustration of the cuff implanted on a sciatic nerve is provided in FIG. 12. At the bottom of FIG. 12, the illustrated cross-sectional areas correspond to the uncoated (at left) and ISM-coated (at right) electrode contacts. The electrical current flow 26 and $Ca^{2+}$ depletion 28 are also shown. The fascicles of the sciatic nerve 15 that diverge into the sural, common peroneal, and tibial nerves are denoted in this diagram as SN, CPN, and TN, respectively.

Electrically conductive layers can have a thickness between 1-50 nm, for example, and can be in the form of a thin indium-tin-oxide (ITO) layer or other electrically conductive layer deposited on a membrane surface, for example, via sputtering. The membrane and/or conductive layers can be encapsulated in PDMS, for example.

We started with an 8 mm section of silicone tubing (VERSILON SPX-50 tubing with a 1.6-mm inner diameter and a 3.2-mm outer diameter) as the substrate, and opened it with a longitudinal cut. To pattern the contacts, we flattened the tubing exterior-down against a glass slide using a piece of polyimide tape with silicone adhesive (1-Mil KAPTON tape from DuPont). Using a computer numerical control (CNC) laser cutter (PLS4.75 from Universal Laser Systems), we then aligned and cut shallow channels through the tape and into the substrate. The electrode contacts were each patterned as three large $1.3 \times 1.4$ mm$^2$ pads interconnected by narrow, $0.5 \times 0.75$ mm$^2$ tracts (6.21 mm$^2$ total area). The purpose of this design was to minimize deformations in the electrode contacts.

The substrate was then released from the glass slide, leaving the polyimide tape on the interior surface to act as a stencil. In order to hold the tubing in the open position, another layer of polyimide adhesive was applied onto the outer surface. In this position, leads wires (30-gauge solid-core copper wires with polyethylene insulation) were inserted through the outer surface of the substrate so that exposed wires (0.5-1 mm) were accessible on the inside, in the center of each contact. The wires were fixed in place by coating two-part epoxy resin at the joint between the wire and the outer surface of the substrate and by coating silver-filled epoxy at the joint between the wire and the inner surface. Covering the entire surfaces of the exposed wires in the interior of the cuff, the silver epoxy served as an additional barrier between the wires and the electrolyte media.

After the epoxy resins holding the lead wires in place were cured, a conductive carbon composite (BQ242, Dupont) was screen-printed onto the inner surface of the substrate using the laser-patterned polyimide as a stencil. One of the carbon-composite contacts was wetted with tetrahydrofuran, and then the ISM cocktail was drop-cast onto it with an initial volume of 6-10 μL. Upon evaporation of the tetrahydrofuran, the ISM had a thickness of approximately 100 μm.

With the electrode contacts fully prepared, the substrate was released from the polyimide adhesive, allowing it to return to its cylindrical shape. Finally, the epoxy joints were encapsulated on the outer surface of the cuff with single-component silicone (3140 RTV silicone from Dow Corning).

Calcium ISMs were prepared as previously described. The selected composition creates a high density of charge sites which increases the membrane's conductivity. The composition comprised, by weight, 4.3% ETH 129, 0.86% sodium tetraphenylborate, 80.84% 2-nitrophenyl octyl ether, and 14% high molecular weight polyvinyl chloride. The composition was diluted in distilled tetrahydrofuran (THF) in a ratio of 1:3 by mass. All chemicals used for these membranes were SELECTOPHORE products purchased from Sigma Aldrich.

The electrical characteristics of my device were evaluated using electrochemical impedance spectroscopy (EIS), cyclic voltammetry (CV), and chronopotentiometry, using the VERSASTAT 3 potentiostat from Princeton Applied Research. All devices were cleaned with isopropanol before testing. In each modality, the electrochemical cell comprised three electrodes immersed in room-temperature phosphate-buffered saline (1×PBS, pH 7.4) with one of the cuffs cathodes as the working electrode, an Ag|AgCl|3.0 M KCl cell as the reference electrode (grounded to enclosing Faraday cage to reduce noise), and a 1×2 cm$^2$ section of carbon paper (SPECTRACARB 2050A-0550 pare from the Fuel Cell Store) as the counter electrode. According to a typical EIS procedure, impedance magnitude and phase were evaluated for sinusoidal waveforms [10 mV root-mean-square (RMS), biased to the cell's open-circuit potential] at 60 frequencies logarithmically spaced between 1 Hz and 1 MHz. CV was performed with a scan rate of 100 mV/s between −1 V and 1 V. Chronopotentiometry was performed at a current of −20 µA for 300 s.

The time-varying behavior of a physicochemical solute transport system is dictated by continuity, given in this case for the 2-D axisymmetric geometry as:

$$\partial c_i / \partial t + \nabla \cdot N_i = o,$$

with $c_i$ as the molar concentration and $N_i$ as the molar flux density of solute, i∈ (Ca$^{2+}$, Na$^+$,Cl$^-$), making the appropriate $\nabla \rightarrow (\partial/\partial r, \partial/\partial z)$ transformation in cylindrical coordinates. Chemical flux of each ion from diffusion and migration is given by the Nernst-Planck equations for dilute solutions:

$$N_i = -D_i(\nabla c_i + z_i F c_i \nabla V / RT),$$

where V is the electric potential; $D_i$ is the diffusion coefficient of solute, i; and $z_i$ is the charge number of solute, i. Meanwhile, F, R, and T hold their usual meanings as Faraday's constant, the universal gas constant, and absolute temperature respectively. The electric potential couples to the space charge density through Poisson's equation:

$$\nabla E = -\nabla^2 V = F \epsilon_o \epsilon_r \sum z_i c_i,$$

where E is the electric field, $\epsilon_0$ is the permittivity of free space, and $\epsilon_r$ is the relative permittivity. The electric current density is defined as:

$$J = F \sum z_i N_i,$$

ignoring displacement currents.

A physicochemical transport model of ions within an ISM cuff electrode is depicted in FIGS. 13 and 14. A two-dimensional axisymmetric model geometry is presented in FIG. 13, with labelled boundary conditions and dimensions. A radial slice of the Ca$^{2+}$ concentration after applying −20 µA for 300 s through the ISM-coated electrode is presented in FIG. 14, numerically solved using Nernst-Planck-Poisson, where the boundary conditions are also labeled.

The transport of ions to and from the membrane surface is governed by flux boundary conditions, which, for each ion, are prescribed as fractions of the overall current. Each fraction corresponds to the integral transport number, Ti, of ion, i, and is defined according to the following equation:

$$n \cdot N_i = n \cdot J T_i / (z_i F),$$

where n is the vector normal to the surface of the ISM. The integral transport numbers depend on the concentrations of intra-membrane ions; and, mutually, the concentrations of those intra-membrane ions depend on the aqueous concentrations of ions. We treated the intra-membrane processes as being in quasi-equilibrium, with its variables solved according to an analytical phase-boundary model. Making this approximation, the integral transport number is equivalent to the transport number, $T_p$:

$$T_p \rightarrow t_p(ISM) = z_P^2(D_{LnP})(C_{LnP}) + z_J^2(D_{LnJ})(C_{LnJ}),$$

$$T_J = 1 - T_P,$$

where P denotes the primary ion (Ca$^{2+}$), J denotes the interfering ion (Na$^+$), and $L_{ni}$ is an ion-ionophore complex of ion, i, having a stoichiometric ratio of n. The concentrations of ionophore-bound species can be determined from the following transcendental system:

$$\frac{K c_{L_n P}}{c_{L_n J} z_{P/z_J} \left( c_L^0 - n_P c_{L_n P} - n_J c_{L_n J} \right)^{n_P - n_J z_{P/z_J}}} = \frac{c_P^{(aq)}}{\left( c_J^{(aq)} \right)^{z_{P/z_J}}},$$

$$c_R^0 = z_P c_{L_n P} + z_J c_{L_n J},$$

$$K \equiv K_{PJ}^{pot} \frac{z_P(c_L^0 - n_P c_R^0/z_P)^{n_P}}{c_R^0} \left[ \frac{c_R^0}{z_J(c_L^0 - n_J c_R^0/z_J)^{n_J}} \right]^{z_{P/z_J}},$$

where $$K_{PJ}^{pot}$$

is the Nikolsky potentiometric selectivity coefficient, $$c_L^0$$

is the total concentration of ionophore added to the ISM (e.g., ETH-129 calcium ionophore), $$C_R^o$$

is the total concentration of lipophilic counter-ion added to the membrane (e.g., tetraphenylborate), and $C_i^{(aq)}$ is the concentration of ion, i, in the aqueous phase.

As a model, $Ca^{2+}$ was the primary ion, $Na^+$ was the interfering ion, $Cl^-$ was the aqueous counter-ion, tetraphenylborate ($TPB^-$) was the lipophilic counter-ion, and ETH 129 was the ionophore. The contribution of other interfering ions, such as $K^+$, was ignored, as these are far less competitive for the ionophore than $Na^+$. These solutes, along with their respective bulk/initial concentrations, were chosen based on the experimental conditions described. For an overview of all of the parameters used, see the Table, below.

| i | $z_i$ | $D_i$ (×10$^{-9}$ m$^2$/s) | $c_i^o$ (mM) | $n_i$ | Phase |
|---|---|---|---|---|---|
| $Ca^{2+}$ | +2 | 0.789 | 2 | 3 | aq |
| $Cl^-$ | −1 | 2.01 | 104 | — | aq |
| $Na^+$ | +1 | 1.35 | 100 | 1 | aq |
| $TPB^-$ | −1 | — | 27.6 | — | ISM |
| $ETH^-$ | 0 | — | 102 | — | ISM |
| (ETH-129) · $Ca^{2+}$ | +2 | 0.01 | — | — | ISM |
| (ETH-129) · $Na^+$ | +1 | 0.01 | — | — | ISM |

Direct concentration measurements were carried out using a source-measurement time-share method. The purpose of these experiments was to measure the concentration of $Ca^{2+}$ in the aqueous diffusion boundary layer adjacent to the ISM-coated contact of the cuffs. A probe was positioned inside the region of interest using micromanipulators. In this case, the probe was a glass micropipette with an ISM embedded in the tip. Using zero-current potentiometry, the concentration of $Ca^{2+}$ was measured using the probe while current was applied across the ISM-coated contact.

The sensor ISM electrodes were fabricated from filamented borosilicate glass capillaries with a 1.5-mm outer diameter and a 0.86-mm inner diameter (from Sutter Instrument). The capillaries were pulled, broken to tip diameters of 75-100 μm, and then silanized using 5% dimethyldichlorosilane in heptane (silanization solution I, Sigma Aldrich). The silanized micropipettes were backfilled with the inner reservoir solution (identical to the bath electrolyte), and their tips were briefly immersed in the ISM cocktail solution, referenced above. The ISM electrodes were then submerged in an electrolyte (identical to the bath electrolyte) and allowed to equilibrate for 24-32 hours prior to their use in experiment. The final thickness of the ISM layer in the tip of each capillary, shrinking after the dissolution of THF, would be ~100 μm.

A schematic illustration of an experimental electrochemical cell for direct concentration measurements for the ISM cuff electrode is provided in FIG. 15, where a microscope objective 38 is used for observation of the process. The electrochemical cell 29 comprised an electrolyte bath 30 of 2-mM $CaCl_2$, 100-mM NaCl, and 25-mM HEPES (a zwitterionic sulfonic acid buffering agent), adjusted to 7.4 pH using NaOH. In addition to the ISM cuff 10 and the sensor ISM 32, the cell contained an Ag|AgCl|3.0-M KCl reference electrode 34 and a 1×2 cm$^2$ section of carbon paper (SPEC-TRACARB 2050A-0550 paper from the Fuel Cell Store) as the counter electrode 36. Current was applied between a cuff's ISM-coated contact and the counter electrode 36. The zero-current electromotive force (EMF) across the sensor ISM 32 was measured between an Ag|AgCl electrode inserted into its inner reservoir and the reference electrode 34. The inner reservoir of the sensor ISM 32 comprised the same media as the electrolyte bath 30. The potential across the sensor ISM 32 was measured with a KEITHLEY 6514 electrometer (from Keithley Instruments of Beaverton, Oregon, USA), using a guarded line to prevent parasitic capacitances. In order to shield the cell from external noise, the sensor ground was connected to a uniform conducting plate that laid directly underneath the system. The current was applied across the ISM-coated contact from one of the channels of a KEITHLEY 2612B sourcemeter (from Keithley Instruments).

The sensor ISM 32 was inserted horizontally into the electrochemical cell 29 through a flexible silicone gasket, and the ISM cuff 10 was inserted through an opening in the top surface of the cell 29. The cuff 10 and sensor 32 were aligned longitudinally using micromanipulators under an Olympus SZX16 microscope, and the tip of the sensor 32 was positioned directly in the center of the ISM-coated contact ring. For the axis parallel to the viewing angle, the sensor 32 was aligned based on the relative positions of the cuff's and sensor's focal planes. Optimal time-share parameters were determined. Considering the settling time of the sensor EMF after changes in the electric current source and the numerical solutions to the physicochemical transport model, the current-on interval, measure interval, and source/measure delay were 5.5 s, 0.167 s, and 0.333 s respectively.

A rat was anesthetized using a cocktail of ketamine/xylazine/acepromazine (KXA; 1:0.125:0.01 ratio by mass), wherein an initial dose of 0.10 mL per 100 g of the rat's body weight was administered intraperitoneally through the lower right abdominal area. After one hour, successive doses at half volume were injected in 45-minute intervals. The depth of anesthesia was monitored by testing the toe pinch reflex on the left hindlimb every 10 minutes. The rat was positioned on its abdominal side over a 37° C. heating pad to maintain its physiological temperature and its hindlimb was mounted over a syringe to attain a more favorable exposure. The area of operation, roughly twice as large as the incision, was prepared by shaving the rat's hair and then disinfecting the area with alternating rounds of 70% ethanol and povidone-iodine.

With the rat fixed in the prone position, an incision of 3-4 cm (via a #15 surgical blade) was made extending from the femur's distal end towards the dorsal midline where the sciatic nerve passes through the ilium. Then, by blunt dissection with blunt hemostats and iris scissors, the femoral biceps and gluteal muscles were separated to permit access to the deep sciatic nerve. Starting 13 mm distal from the sciatic notch, the sciatic nerve was exposed along the lateral aspect of the limb from ilium to trifurcation (approximately 2.5 cm, leaving room for slightly more than two lengths of the cuff).

The cuff was wrapped around the main branch of the sciatic nerve proximal to its trifurcation, affixing sutures around the device to seal the opening. Finally, the wound was closed by suturing the skin with one layer of 5-0 PROLENE polypropylene surgical knots (from Ethicon Inc.), leaving percutaneous leads for amplifier connection.

To quantify changes in firing characteristics of the sciatic nerve, intramuscular electromyographic recordings were performed on three of its downstream targets—the gastrocnemius, tibialis anterior, and biceps femoris muscles. Compound muscle action potentials (CMAP), which proxy upstream activity of innervating fibers, were recorded from pairs of stainless-steel electromyography (EMG) needles inserted into each muscle with gaps of approximately 1 cm. With a differential amplifier (a PZ2 amplifier from Tucker-Davis Technologies, sampled at 25 kHz), each channel was acquired versus a distant reference needle inserted into the latissimus dorsi muscle (approximately 10 cm from the nerve exposure).

Each channel was recorded simultaneously for the entire duration of the experiment, throughout threshold-search, prolonged-current, and non-treatment stages of the protocol. In the threshold-search and prolonged-current stages, the current was driven through either the ISM-coated or uncoated contact in a monopolar configuration from a current-controlled amplifier (a 2612B sourcemeter from Keithley). For each contact, a stainless steel electromyographic (EMG) needle inserted into the latissimus dorsi muscle (separate from the EMG reference) served as the grounded return for current. In the prolonged current stages, the instrument supplied a constant current of $-20$ $\mu A$ for 5 minutes. In the threshold search stages, it applied a ramp of pulses, increasing in magnitude linearly over time. Each ramp consisted of 20 steps spaced evenly between $-5$ $\mu A$ and $-200$ $\mu A$ (nominal applied current), and each step consisted of three 1 ms monophasic pulses triggered 3 seconds apart. The sourcemeter unit recorded the actual currents applied in each of these pulses, which differed from the nominal levels in cases where the electrode impedance was high.

For each pulse driven through the cuff electrode in the threshold search stages, the downstream activation of each muscle was quantified by the peak rectified amplitude of the elicited CMAP. The ISM cuff depleted calcium ions in situ.

Figures 16, 17, 18, 19:
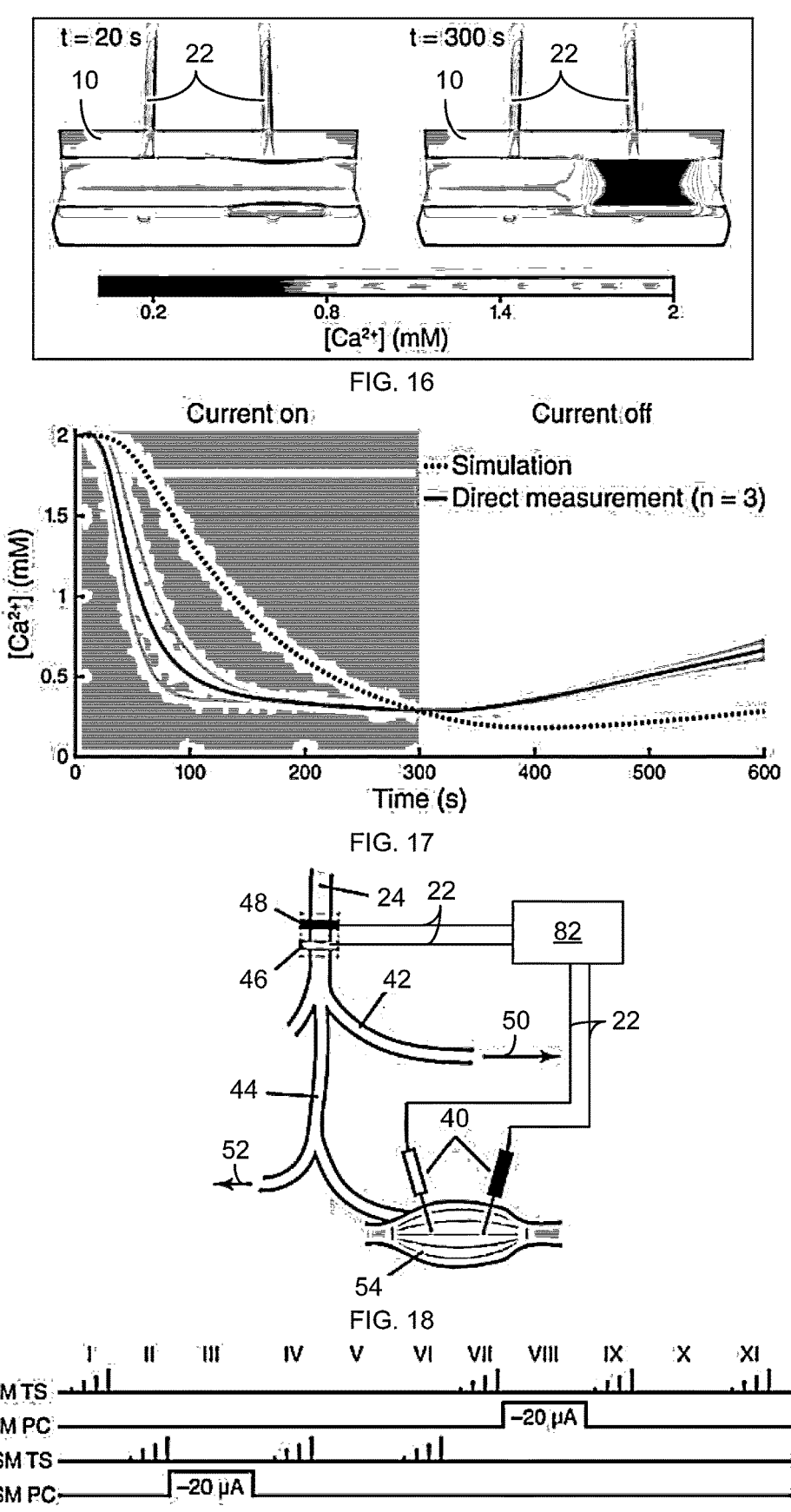
FIG. 16 illustrates the numerical results to the Nernst-Planck-Poisson solute transport model at $t=20$ s and $t=300$ s.
FIG. 17 plots the direct concentration measurements of $Ca^{2+}$ at the center of the ISM-coated contact ring during polarization with $-20$ μA, where the shaded region shows a standard deviation, $n=3$).
FIG. 18 is a schematic illustration of nerve preparation in an experimental setup for acute in vivo rat sciatic nerve studies, showing the locations of the cuff electrode and electromyography (EMG) needles with respect to the sciatic nerve and its branches.
FIG. 19 shows the experimental protocol for threshold measurements, divided into eleven sequential stages, where each stage corresponds to either a threshold search (TS), prolonged current (PC), or rest interval from either the ISM-coated contact (+ISM) or uncoated contact (−ISM).

FIGS. 16-17 provide a characterization of the ISM-cuff electrode—in this case, its ability to electrochemically deplete $Ca^{2+}$ by applying $-20$ $\mu A$ for 300 seconds (s). Numerical results are illustrated in FIG. 16 for the Nernst-Planck-Poisson solute transport model at two times, t: t=20 s and t=300 s. Direct concentration measurements of $Ca^{2+}$ at the center of the ISM-coated contact ring during polarization with $-20$ $\mu A$ are plotted via the solid line in FIG. 17 (the shaded region shows a standard deviation, n=3), wherein the simulation results are plotted via the dotted line.

An experimental setup for acute in-vivo rat sciatic nerve studies. A schematic illustration of nerve preparation is provided in FIG. 18, showing the locations of the cuff electrode 10 and EMG needles 40 with respect to the sciatic nerve 24 and its branches [e.g., the common peroneal nerve 42 (leading to the tibialis anterior muscle 50) and the tibial nerve 44 (leading to the biceps femoris muscle 52). As shown therein, the EMG needles 40 are inserted into the gastrocnemius muscle 54. The controller 82 (e.g., a computer with a processor in communication with a computer-readable medium storing software code for making the determinations and issuing commands to carry out the methods described herein). The controller 82 is electrically coupled with a power source and with the various electrodes via the lead wires over which the controller can transmit electrical current/signals to the electrodes.

The experimental protocol for the threshold measurements is shown in FIG. 19, divided into eleven sequential stages. Each stage corresponds to either a threshold search (TS), prolonged current (PC), or rest interval from either the ISM-coated electrode 46 (+ISM) or uncoated electrode 48 (-ISM). The raw EMG time-series for the gastrocnemius recorded over the course of the entire experimental protocol is plotted in FIG. 20, with a call-out for a narrow, 0.4-ms interval of the raw EMG time-series showing a single compound muscle action potential (CMAP). The peak level (absolute value) used to construct the recruitment curves is indicated in this plot. The nominal applied current during each of the threshold search stages is plotted at lower left in FIG. 20.

Means and standard deviations for the absolute thresholds in each muscle group and contact before $Ca^{2+}$ depletion (Stages I and II in the protocol) across each of the subjects are provided in the Table, below.

| | Gastrocnemius | Biceps femoris | Tibialis anterior |
|---|---|---|---|
| ISM contact | 78.1 ± 3.5 µA (n = 8) | 77.8 ± 24.0 µA (n = 8) | 70.9 ± 21.1 µA (n = 8) |
| Uncoated contact | 88.5 ± 20.1 µA (n = 7) | 84.6 ± 21.8 µA (n = 7) | 71.2 ± 9.59 µA (n = 7) |

Repeatedly, the ISM-cuff electrode reduced the thresholds of the subjects by $-49.3\pm11.6\%$ (n=8), $-50.0\pm10.6\%$ (n=8), and $-35.1\pm13.8\%$ (n=8) relative to their levels in stage II for the gastrocnemius, biceps femoris, and tibialis anterior channels, respectively.

Figures 20, 21, 22:
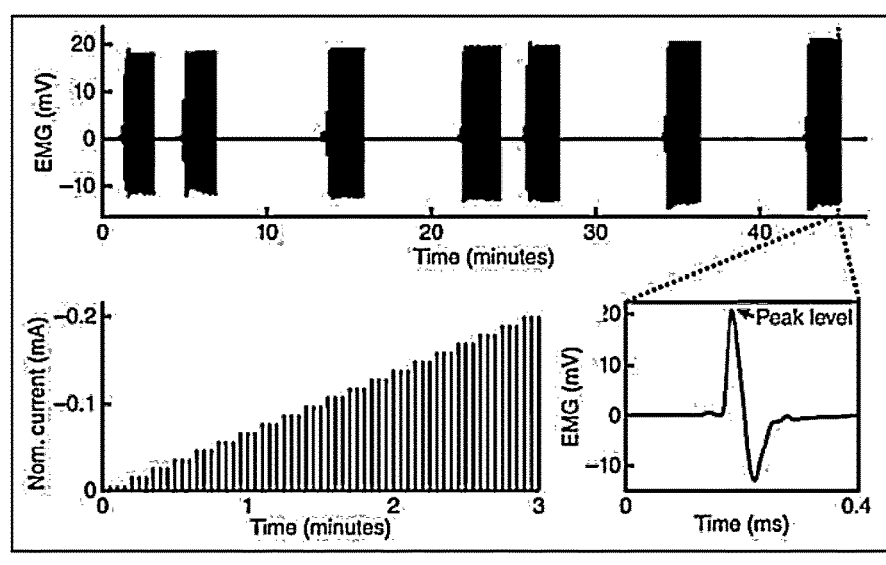
FIG. 20 plots a raw EMG time-series for the gastrocnemius recorded over the course of the entire experimental protocol with a call-out below highlighting a narrow, 0.4 ms interval of the Raw EMG time-series showing a single compound muscle action potential (CMAP); the peak level (absolute value) used to construct the recruitment curves is indicated in this plot. Meanwhile, the plot at lower left shows the nominal applied current during each of the threshold search stages.
FIG. 21 plots the relative changes in threshold for the gastrocnemius, biceps femoris, and tibialis anterior before and after $Ca^{2+}$ depletion and control manipulations, measured across eight subjects.
FIG. 22 is a plot of the example recruitment curves for subject 2, corresponding to the threshold measurements taken in the experimental group (stages II, IV, and VI).

Threshold search results for the gastrocnemius, biceps femoris, and tibialis anterior, corresponding to the top, middle, and bottom rows respectively are plotted in FIG. 21. Relative changes in threshold before and after $Ca^{2+}$ depletion and control manipulations, measured across eight subjects, are included in the plots of FIG. 21. For each channel, the relative changes in thresholds measured before versus after $Ca^{2+}$ depletion (stage III) satisfied $**p<0.001$ (based on the two-sample t-test with equal variance assumption) with respect to the relative changes that were induced before versus after the current on the uncoated channel (stage VIII). For each channel, the relative change in threshold (%) is plotted for each of the following conditions:

+ISM after vs. before $Ca^{2+}$ depletion 56,
+ISM 5 minutes after vs. before $Ca^{2+}$ depletion 58,
-ISM after vs. before uncoated current 60, and
-ISM after vs. before $Ca^{2+}$ depletion 62.

There was no statistically significant difference (ns, based on the two-sample t-test with equal variance assumption) observed between the gastrocnemius and biceps femoris channels, both for the thresholds measured immediately after $Ca^{2+}$ depletion (stage IV) and for the thresholds measured 5 minutes after $Ca^{2+}$ depletion (stage VI). Between both the gastrocnemius and tibialis anterior channels and the biceps femoris and tibialis anterior channels, there was a statistically significant difference, satisfying $*p<0.05$ (based on the two-sample t-test with equal variance assumption), both for the thresholds measured immediately after $Ca^{2+}$ depletion (stage IV) and for the thresholds measured 5 minutes after $Ca^{2+}$ depletion (stage VI).

FIG. 22 includes plots of example recruitment curves for subject 2, corresponding to the following threshold measurements taken in the experimental group (stages II, IV, and VI):

+ISM threshold before $Ca^{2+}$ depletion (stage II) 64,
+ISM threshold after $Ca^{2+}$ depletion (stage IV) 66, and
+ISM threshold five minutes after $Ca^{2+}$ depletion (stage VI) 68.

Figures 23, 24, 25, 26, 27:
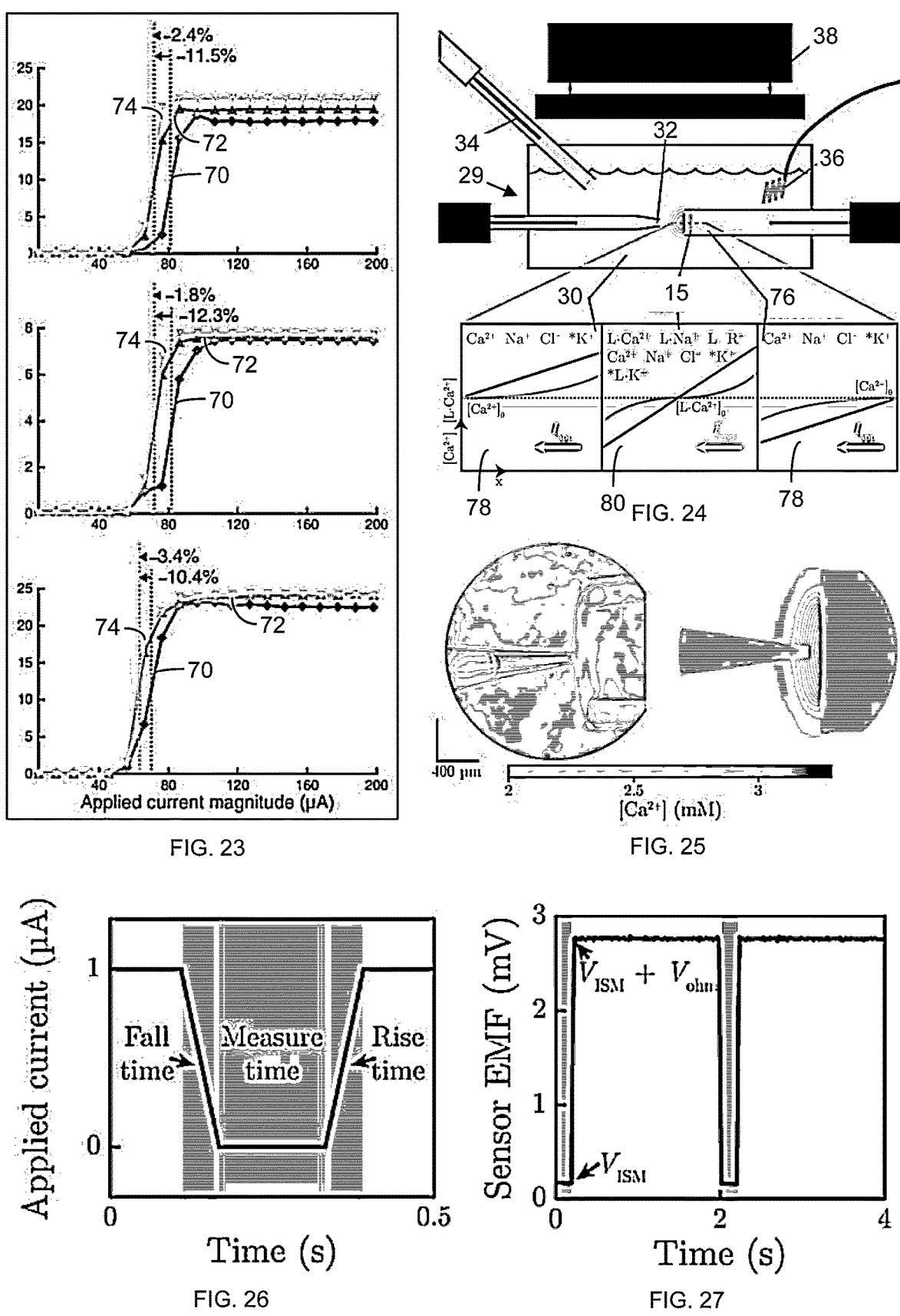
FIG. 23 is a plot of the example recruitment curves for subject 2, corresponding to the threshold measurements taken in the control groups (stages I, VII, and IX).
FIG. 24 is a schematic illustration of an experimental setup, where * indicates species that are present in the experiment, but not in the mathematical model.
FIG. 25 is a photographic image of the two ISM capillaries aligned under the microscope (left) and simulation results overlaying the model geometry (right; 2-D axisymmetric model; $I_{app}=0.4$ μA).
FIGS. 26 and 27 plot waveforms of electric current applied to the driver ISM and raw EMF measured from the sensor ISM, demonstrating the principles of time-shared measurements. During the short intervals denoted as the "Measure time," the current is shut off and a measurement is taken (timed to avoid the rise and fall times). During this interval, the sensor EMF reflects the boundary potentials across the ISM rather than that combined with the Ohmic potential drop generated by the external current (i.e., the sensor indicates $V_{ISM}$ during the "Measure time" and $V_{ISM}+V_{ohm}$ when the current is resumed).

FIG. 23, meanwhile, includes plots of example recruitment curves for subject 2, corresponding to the following threshold measurements taken in the control groups (stages I, VII, and IX):

–ISM threshold before $Ca^{2+}$ depletion (stage I) 70,
–ISM threshold after $Ca^{2+}$ depletion (stage VII) 72, and
–ISM threshold after uncoated current (stage IX) 74.

An alternative configuration for multimodal stimulation was designed to reduce the power requirements of the excitatory electrical stimulation. Stages I-VII were under the same conditions as were previously described, with the exception that the electrical stimulation applied for the threshold search in stages II and IV was delivered with an external electrode. The external electrode was comprised of a thin, 76-μm-diameter platinum wire wrapped twice around the circumference of the nerve. The wire was inserted around the nerve before introducing the cuff, and the cuff was implanted such that the wire was located directly between the ISM-coated contact and the nerve. The depletion of $Ca^{2+}$ produced behavior matching that observed from the original configuration—the thresholds of the nerve changed by −16.1%, −14.4%, and −1.02% relative to their levels in stage II for the gastrocnemius, biceps femoris, and tibialis anterior respectively. Driving electrical stimulation through the low-impedance platinum wire rather than the ISM-coated contact, whose impedance increases during prolonged current, this configuration succeeded in lowering the threshold of stimulation while sourcing less power.

While there was no statistically significant difference between the activation thresholds of the gastrocnemius and biceps femoris, a significant difference did exist between those muscles and the tibialis anterior, satisfying $p<0.05$. Furthermore, this difference can be seen in the alternative configuration with the external electrode. Considering the fact that the biceps femoris and gastrocnemius are both innervated by the tibial branch of the sciatic nerve while the tibialis anterior is innervated by the common peroneal branch, these results strongly suggest that $Ca^{2+}$ depletion affected the tibial branch to a larger extent than it affected the common peroneal branch.

$Ca^{2+}$ depletion had asymmetrical effects on the common peroneal and tibial branches of the sciatic nerve. In subject 2, for instance, stimulating the nerve at −40.7 μA after $Ca^{2+}$ depletion excited the gastrocnemius selectively to 100% of its maximal level, while activating the tibialis anterior to only 50.4% of its maximal level. Simultaneously, by stimulating the nerve at −96.0 μA on the uncoated contact, the tibialis anterior was excited selectively to 100% of its maximal level, while activating the gastrocnemius to only 3.3% of its maximal level. This phenomenon offers a new potential mechanism with which electrical neuroprosthetics can exert selective and graded control over a nerve.

The basis for this selective behavior may be the morphological differences between the fascicles of the sciatic nerve. The diameter of the fascicle that diverges into the common peroneal nerve is smaller than the tibial nerve's respective fascicle, and the fibers within the common peroneal nerve are narrower, on average, than those of the tibial nerve. Furthermore, the differences in axon diameter may correlate with variations in the gene expression of voltage-gated sodium channels, whose activity is intrinsically linked to the nerve's firing threshold. Ten varieties of voltage-gated sodium channels are currently known and previous studies have reported preferential expression of these subtypes in axons having diameters within specific ranges. Considering that the effect of $Ca^{2+}$ modulation mechanistically involves voltage-gated sodium channels and that some evidence exists that the influence of $Ca^{2+}$ on these channels preferentially affects particular subtypes, differential expression may be another potential contributing factor to the selectivity of electrochemical modulation.

This discussion focuses on ion depletion, as this operation is more straightforward for solid-contact devices-depletion can be performed without first loading the targeted ion into the membrane system. However, ISM-based devices can not only deplete under cathodic current but can also enrich under anodic current. For example, $Ca^{2+}$ enrichment may be used to impede the transmission of signals along a nerve. Similarly to DC and HFAC nerve blocks, this technique can also be applied to intercept painful sensory signals from being delivered to the central nervous system (CNS).

Improvements in the device may include incorporating lipophilic membrane additives. Additionally, delamination can be minimized by embedding the membrane in a silicone-based matrix.

Due to the finite charge-injection capacity of the electrode, there is a practical limit to how long concentration changes can be driven at a particular magnitude of the current. However, in contrast with approaches that rely on finite reservoirs, the device does not need to be physically accessed to refill it; rather, the electrode can be restored by reversing the polarity on the electrode. The necessity of restoring the electrode may make the current approach unsuitable for applications that require continuous operation. Yet, this is not a fundamental limitation in the same way that the finite capacity of reservoirs is; continuous operation with an ISM-based device can be enabled, for example, using MEMS or ion-tronic rectifiers.

Leveraging the confined volume created by the insulated body of the cuff, the multimodal stimulator can control $Ca^{2+}$ concentrations within a targeted region. These results suggest that multimodal stimulation with an ISM-based device can be used to enhance the selectivity of treatment for neuro-modulation and FES purposes. Furthermore, the principles of electrochemical concentration control can be applied to the manipulation, both enrichment and depletion, of other ions, such as $K^+$ and $Mg^{2+}$. Considering the documented effects of the extracellular concentrations of these ions on neurons, other applications, such as nerve blocking for pain relief are feasible.

Selective ion filtering, a multidisciplinary subject with perspectives including those of analytical chemistry and physics, relies on membrane-based technologies for most of its approaches. Eminent among these, is the ion-exchange membrane. By virtue of densely packed fixed-charge groups, the ion-exchange membrane selectively transports dissolved ions of opposite charge (counter-ions) under the driving forces of diffusion, electrophoresis, and convection. This charge-based selectivity (having selective affinity for either cations or anions) makes the ion-exchange membrane performant in many crucial applications, including desalination of natural water sources, biosensing of clinical blood samples, and proton-exchange membrane fuel cells. Here, we discuss carrier-mediated transport in liquid membranes, its theory and practical considerations that, for similar operating conditions as ion-exchange membranes, remain in an early stage of development.

Single-ion selectivity refers to the ability of the membrane to transport one particular ion within a mixed electrolyte while blocking all others. Ion-exchange membrane systems have demonstrated success in a limited set of applications that require single-ion selectivity, including NaCl extraction from seawater for edible products, NaCl extraction for chlor-alkali industrial production, the removal of specific ions from liquid waste, and lithium recovery from brine. However, ion-exchange membranes only work for these applications when the selected ion is being separated from other ions with different valences—such as $Na^+$ in the presence of $Ca^{2+}$. For the more general case, where the selected ion may need to be separated from ions of identical charge (e.g., $Na^+$ separated from $K^+$), the only documented method known to us for creating a membrane with single-ion selectivity is by incorporating labile carriers that reversibly bind with the selected ion.

General single-ion selectivity with a carrier-based membrane unlocks a broad range of ion removal and recovery applications, such as the selective removal of $Na^+$ from the drainage water of greenhouses. Single-ion selectivity also enables new methods of chemical delivery in biological systems with ion-tronic devices. Electrodes coated with carrier-based liquid membranes, selective for ions such as $Ca^{2+}$, $Na^+$, and $K^+$, can selectively modulate the concentrations of those ions in peripheral nerve tissue. Impeding progress in these areas, however, current understanding of driven transport across carrier-based membrane systems remains incomplete. We investigated specific phenomena related to transport selectivity by analyzing temporal changes in the concentrations of ions directly adjacent to a carrier-based liquid membrane during its operation. This investigation represents what we believe to be the first local concentration measurements of membrane-generated concentration polarization. We accomplished this measurement using a new technique, described below, which can also be more broadly applied in applications for the characterization of electrochemical systems.

Carrier-based liquid membranes have been studied most extensively in the context of potentiometric concentration sensing. After decades of development, a wide range of lipophilic carriers, termed ionophores, exist for both cationic and anionic species. Although some recently introduced modalities operate under active electrical polarization, membrane sensors traditionally use zero-current conditions. Thus, most investigations of these systems focus on near-equilibrium behavior. However, newer applications of carrier-based liquid membranes, biological chemical delivery and selective ion removal/recovery, operate under more intensive regimes, driving currents in excess of 1 $A/m^2$.

While we now understand that, for ion-exchange membranes, intensive operation leads to over-limiting processes, such as electro-osmotic micro-vortex formation and water-splitting, the respective limits and the consequences of exceeding limits are not well defined for carrier-based liquid membranes. Although many of the same principles apply in both systems, the liquid membrane is unique in that its constituents (i.e., the lipophilic carrier and lipophilic counter-ion) are mobile, albeit confined, within its phase. Carrying out direct concentration measurements using a source-measurement time-sharing technique, we evaluated a membrane system with respect to theoretical predictions from a physicochemical transport model. Through our examination of selective transport, we identified limits of operating a carrier-based liquid membrane under galvanostatic control and found that boundary phenomena adversely affected membrane performance.

The time-varying behavior of a physicochemical solute transport system is dictated by continuity, given in this case for 1-D as:

$$(\partial c_i)/\partial t + (\partial N_{(x,i)})/\partial x = o,$$

with $c_i$ as the molar concentration and $N_{(x,i)}$ the x-component of the molar flux density of solute, i. The chemical flux of each solute from diffusion and migration is given by the Nernst-Planck equations for dilute solutions:

$$N_{(x,i)} = -D_i((\partial c_i)/\partial x + (z_i F)/RT c_i \partial V/\partial x),$$

where V is the electric potential; $D_i$ is the diffusion coefficient of solute, I; and $z_i$ is the charge number of solute, i. Meanwhile. F, R, and T hold their usual meanings as Faraday's constant, the universal gas constant, and absolute temperature, respectively. The electric potential couples to the space charge density through Poisson's equation:

$$\frac{\partial E_x}{\partial x} = -\frac{\partial^2 V}{\partial x^2} = \frac{F}{\epsilon_0 \epsilon_r} \sum_i z_i c_i,$$

where $E_x$ is the x-component of the electric field, $\epsilon_0$ is the permittivity of free space, and $\epsilon_r$ is the relative permittivity. The electric current density is defined as:

$$J_x = F \sum_i z_i N_{x,i},$$

ignoring displacement currents.

In the membrane phase, the following reversible reactions described ionophore binding:

$$n_P L + P^{Z_{P^+}} \rightleftharpoons L_{n_P} P^{Z_{P^+}}, \text{ and}$$

$$n_J L + J^{Z_{J^+}} \rightleftharpoons L_{n_J} J^{Z_{J^+}},$$

where L is the ionophore, $P^{z_{p^+}}$ is the primary ion, $J^{z_{J^+}}$ is an interfering ion, and $n_J$ is number of ionophore molecules that bind to a single ion in a particular complex. In this model, these reactions were implemented as interior boundary conditions, described below. In addition to each of these solutes, the system contained a mobile lipophilic counter-ion ($R^-$) and an aqueous counter-ion ($N^-$).

The system comprises a membrane of width, d, placed between two ideal electrodes at distances of $\delta_N$ (length of Nernst steady diffusion layer). In each case described herein, we gave identical conditions to both sides of the membrane. The following describes the Dirichlet boundary conditions applied for each hydrophilic solute in the aqueous phase:

$$c_i\left(x = -\frac{d}{2} - \delta_N\right) = c_i\left(x = \frac{d}{2} + \delta_N\right) = c_i^0.$$

Finally, we took initial and bulk values for lipophilic solutes in the aqueous phase and for all solutes in the membrane phase from solutions to an analytical equilibrium model.

In order to model galvanostatic polarization across the electrodes such that $$J_x\left(x = -d/2 - \delta_N\right) = J_x^{app},$$

we applied an electric field boundary condition that compensated for diffusion currents (using an electrode at x=d/2+$\delta_N$, as the ground reference point).

In this model, transport across the interfacial transition regions was dictated by ion-ionophore complexation and the differential solubility between the two phases. We assumed an infinitely thin transition region with fast reaction kinetics (i.e., $\vec{k}_i \to \infty$). Under these conditions, the following expressions hold for the differential solubility and ion-ionophore complexation respectively:

$$\frac{c_i^{\gamma(aq)}}{c_i^{\gamma(org)}} = K_i^{part}, \text{ and}$$

$$\frac{c_{i_n P}^{\gamma(org)}}{c_i^{\gamma(org)}\left(c_L^{\gamma(org)}\right)^{n_i}} = \beta_i,$$

where $\beta_i$ is the stability coefficient of the ion-ionophore complex, $$K_i^{part}$$

is the partition coefficient, $\gamma$ denotes the values of variables immediately adjacent to the interior boundaries between the two phases, (org) denotes variables within the membrane phase, and (aq) denotes variables within the aqueous phase. The first equation above applies to each of the ions present in the system (aqueous and lipophilic counter-ions We assumed that the free ionophore remained confined within the membrane, with a negligible concentration in the aqueous phase. Therefore, in this model, unbound $P^{z_P+}$ and $J^{z_J+}$ existed in the aqueous phase, $L_{n_J}J^{z_J+}$, $L_{n_P}P^{z_P+}$, and L existed in the membrane phase, and the lipophilic and aqueous counter-ions existed in their respective phases.

In this model, we chose $Ca^{2+}$ as the primary ion $P^{z_P+} \to Ca^{2+}$, $Na^+$ as the interfering ion ($J^{z_J+} \to Na^+$), $Cl^-$ as the aqueous counter-ion ($N^- \to Cl^-$), tetraphenylboron ($TPB^-$) as the lipophilic counter-ion ($R^- \to TPB^-$), and ETH 129 as the ionophore ($L \to$ ETH 129). The contribution of other interfering ions, such as $K^+$, were ignored, as these ions are far less competitive for the ionophore than $Na^+$.

The aqueous diffusivities of these ions were given by their commonly published values at room temperature, T=25° C. Meanwhile, membrane diffusivity of the ionophore, ion-ionophore complex, and mobile lipophilic counter-ion were estimated based on published values for various plasticizer/polyvinyl chloride (PVC) compositions. We approximated diffusivity values for each ion in their respective insoluble phases. For the diffusion coefficient of the lipophilic counter-ion, we chose a value that matched the temporal characteristics of the experimental results (within the range of published values). The relative permittivity of the aqueous and membrane phases are $$\epsilon_r^{(aq)} = 80 \text{ and } \epsilon_r^{(org)} = 14,$$

respectively, taken from published values.
Default Model Parameters:

| i | $z_i$ | $D_i^{(aq)}$ ($\times 10^{-9}$ m²/s) | $D_i^{(org)}$ ($\times 10^{-11}$ m²/s) | $c_i^0$ (mM) | $\log \dfrac{\beta_i}{\beta_0}$ [a] | $n_i$ | $\log K_i^{part}$ |
|---|---|---|---|---|---|---|---|
| $Ca^{2+}$ | +2 | 0.789 | — | 2 | 20.2 | 3 | 24.3 |
| $Cl^-$ | −1 | 2.01 | 2.01 | 104 | — | — | 24.3 |
| $Na^+$ | +1 | 1.35 | — | 100 | 21.0 | 1 | 24.3 |
| $TPB^-$ | −1 | 0.1 | 1 | 27.6[b] | — | — | −4.35 |
| ETH 129 | 0 | — | 1 | 102[b] | — | — | — |
| (ETH 129)•$Ca^{2+}$ | +2 | — | 1 | — | — | — | — |
| (ETH 129)•$Na^+$ | +1 | — | 1 | — | — | — | — |

[a] Characteristic units, $\beta_0 = 1$ (mM)$^{-n_i}$
[b] Total initial concentrations of lipophilic ions added to membrane included), while both equations apply to L, $P^{z_P+}$, and $J^{z_J+}$. In the model, the equations were implemented with "stiff-spring" conditions on the interior boundaries corresponding to the interfacial transition regions between the membrane and aqueous phases:

$$N_{x,N}^{\gamma(org)}(x = \pm d/2) = N_{x,N}^{\gamma(aq)}(x = \pm d/2) = \pm M \cdot \left(K_N^{part} c_N^{\gamma(org)} - c_N^{\gamma(aq)}\right),$$

$$N_{x,R}^{\gamma(org)}(x = \pm d/2) = N_{x,R}^{\gamma(aq)}(x = \pm d/2) = \pm M \cdot \left(K_R^{part} c_R^{\gamma(org)} - c_R^{\gamma(aq)}\right),$$

$$N_{x,L_n P}^{\gamma(org)}(x = \pm d/2) = N_{x,P}^{\gamma(aq)}(x = \pm d/2) = \pm M \cdot \left(\frac{K_P^{part}}{\beta_P} c_{L_n P}^{\gamma(org)} - c_P^{\gamma(aq)} c_L^{\gamma(org)}\right),$$

$$N_{x,J}^{\gamma(aq)}(x = \pm d/2) =$$

$$N_{x,L_n J}^{\gamma(org)}(x = \pm d/2) = \pm M \cdot \left(\frac{K_J^{part}}{\beta_J} c_{L_n J}^{\gamma(org)} - c_J^{\gamma(aq)} c_J^{\gamma(org)}\right), \text{ and}$$

$$N_{x,L}^{\gamma(org)}(x = \pm d/2) = -n_J N_{x,L_n J}^{\gamma(org)}(x = \pm d/2) - n_P N_{x,L_n P}^{\gamma(org)}(x = \pm d/2),$$

where M is the stiff-spring parameter.

The diffusion boundary layer (DBL) thickness, $\delta_N$, ranges from 230-300 µm in different systems under non-forced hydrodynamic conditions. Given the temporal characteristics of the system, we determined that $\delta_N$=250 µm. The membrane had a thickness of d=100 µm, and its composition was derived from the one used in these experiments. We took its Nikolsky potentiometric selectivity coefficient for $Ca^{2+}$ over $$Na^+ \text{ as } \log K_{Pj}^{pot} = -5.8.$$

The binding stability coefficient and complex stoichiometry of the ionophore for the primary ion were taken to be $\beta_P = 10^{20.2}$ mM$^{-1}$ and $n_P$=3, respectively. The stability coefficient for the interfering ion was calculated in terms of the Nikolsky potentiometric selectivity coefficient. Finally, the partition coefficients were approximated based on the lifetime of the system, which we observed experimentally to be on the order of days. Stability and partition coefficients of such magnitudes result in extremely small values, making a logarithmic transformation necessary.

The maximum element size was $\delta=1$ μm in the aqueous domains, $\delta=0.1$ μm in the membrane domain, and $\delta=0.003$ nm in the transition regions. Hermite shape functions of seventh order were used for the logarithmically transformed concentration variables. The electric potential was calculated using Lagrange shape functions of either fourth or fifth order. The Jacobian was updated on every time-step with a maximum of 25 iterations and a tolerance factor of $10^{-3}$. The initial step size was set to $t_0=10^{-16}$ s, and the relative tolerance was $Rtol=10^{-16}$.

The purpose of these experiments was to measure the concentrations of ions in the aqueous diffusion boundary layer of the membrane. In a manner similar to scanning electrochemical microscopy (SECM), a probe was positioned inside the region of interest using micromanipulators. In this case, the probes were glass micropipettes with ion-selective membranes embedded in the tips. Using zero-current potentiometry, the concentrations of ions were measured using these probes while current was applied across the adjacent membrane. The response time of this modality is on the order of ~10 ms for relevant systems, making it appropriate for accurately measuring the temporal evolution of the aqueous diffusion boundary layer.

Both the driver ISM (across which current was applied) and sensor ISM electrodes were fabricated from borosilicate glass capillaries (1.5-mm outer diameter, 0.86-mm inner diameter from Sutter Instrument). Filamented glass was used only for the $Ca^{2+}$ sensors. The glass capillaries of the sensors were pulled and then broken to tip diameters of 75-100 μm, and those of the drivers were left at their original diameters. Before inserting the ISM cocktails, each capillary was silanized using 5% dimethyldichlorosilane in heptane (SELECTOPHORE ionophore from Supelco). The driver ISM was $Ca^{2+}$-selective in all cases, and the sensor ISMs were either $Ca^{2+}$-, $Na^+$-, or $K^+$-selective. Each formulation was based on those reported in prior literature.

FIGS. 24-28 are directed to an experiment for direct concentration measurements using time-sharing. A schematic illustration of the experimental setup is provided in FIG. 24 (* indicates species that are present in the experiment but not in the mathematical model). As shown, the device includes an electrochemical cell 29 containing driver ISM 15, an electrolyte bath 30 into which are inserted a sensor ISM 32, a reference electrode 34, and a counter electrode 36, with the ions and concentrations in the aqueous solution 78 and the membrane-confined solution 80 indicated below.

FIG. 25 presents a photograph of the two ISM capillaries aligned under the microscope (left) and simulation results overlaying the model geometry (right; 2-D axisymmetric model; $I_{app}=0.4$ μA). Waveforms of current applied to the driver ISM and raw EMF measured from the sensor ISM are provided in FIGS. 26 and 27, demonstrating the principles of time-shared measurements. During the short intervals denoted as the "Measure time," the current is shut off and a measurement is taken (timed to avoid the rise and fall times). During this interval, the sensor EMF reflects the boundary potentials across the ISM rather than that combined with the Ohmic potential drop generated by the external current (i.e., the sensor indicates $V_{ISM}$ during the "Measure time" and $V_{ISM}+V_{ohm}$ when the current is resumed). A theoretical comparison of $Ca^{2+}$ measurements taken during constant galvanostatic polarization (solid lines) and time-sharing (dashed lines) is provided in FIG. 28, with current applied in the first 100 seconds (based on numerical solutions to the 2-D axisymmetric model).

The capillary for each driver ISM was immersed into the appropriate cocktail such that a ~2 mm column of the cocktail solution entered the shaft. The tetrahydrofuran (THF) of the cocktail was allowed to evaporate over 10 minutes, and then the capillary was backfilled with the inner reservoir solution. After evaporation and dissolution of the THF, the final thickness of the column was 100 μm. The ISM capillary would then be fully immersed in electrolyte (of identical composition to the inner reservoir) and allowed to equilibrate for 24-32 hours prior to experiment.

For the sensor ISMs, each capillary was first backfilled with the inner reservoir solution. Then, the tips were immersed in the cocktail solution such that columns of ~1 mm entered the shanks. For the PVC-based membranes, each ISM capillary was immersed in electrolyte (of identical composition to the inner reservoir) and allowed to equilibrate for 24-32 hours prior to experiment. After dissolution of THF, the column of the ISM shrunk to 100-150 μm. For each of the non-PVC membranes, the electrode was prepared immediately prior to an experiment without prolonged equilibration.

The electrochemical cell comprised an electrolyte bath of 2-mM $CaCl_2$, 100-mM NaCl, 10-mM KCl, and 25-mM HEPES buffer, adjusted to 7.4 pH using NaOH. In addition to the driver ISM and the sensor ISM, the cell contained an Ag|AgCl|3.0 M KCl reference electrode and a platinum wire counter-electrode. Current was applied across the driver ISM between a platinum wire inserted into its inner reservoir and the counter-electrode. The zero-current EMF across the sensor ISM was measured between an Ag|AgCl electrode inserted into its inner reservoir and the reference electrode. The inner reservoirs of both the sensor and driver ISMs comprised the same media as the electrolyte bath. The potential across the sensor ISM was measured with a KEITHLEY 6514 Electrometer, using a guarded line to prevent parasitic capacitances. In order to shield the cell from external noise, the sensor ground was connected to a uniform conducting plate that laid directly underneath the system. The current was applied across the driver ISM from one of the channels of a KEITHLEY 2612B sourcemeter.

The driver and sensor ISMs were inserted horizontally, at diametric ends of the electrochemical cell through flexible silicone gaskets. Their tips were aligned and positioned to the correct distances under the objective of an Olympus SZX16 microscope. For the axis parallel to the viewing angle, the sensor was aligned based on the relative positions of the electrodes' focal planes. The tip-to-tip distances were determined from an eyepiece reticle.

The concentration of selected ions can be directly calculated from the equilibrium potential of the sensor ISM. However, as a result of electric current being applied across the driver ISM, an Ohmic potential drop exists at the location of the sensor that contaminates the measurement of equilibrium potential. In order to avoid this effect, we operated the two membrane devices on a time-sharing basis, similar to the discontinuous single-electrode voltage clamp used by the field of electrophysiology. Using this technique, the temporal evolution of the diffusion boundary layer could be evaluated while applying constant current.

On a repetitive basis, under instrument control, the driver ISM was switched off to allow the sensor membrane to take a measurement and then switched back on immediately after. The measurement was initiated in the narrow window between the rise and fall times of the current source. The measurement itself was integrated over 0.167 seconds, a compromise between speed and noise suppression.

By choosing a sufficiently large ratio between the current-on interval and the current-off interval, we can effectively apply a constant current across the driver ISM. To determine the appropriate ratio, we evaluated the effects of time-sharing using solutions to my mathematical transport model. For these solutions alone, we made the following modifications to the model: (1) we restricted the model the external aqueous region, approximating that the ISM is ideally selective for Ca²⁺, and (2) we used a 2-D axisymmetric geometry. This model indicates that only negligible differences exist between the effects of constant current and the effects of time-sharing with a current-on interval of 1.83 seconds. Considering these factors, we determined that optimal time-sharing parameters are as follows: 1.83 s current-on interval, 0.167 s current-off interval, and 0.0167 s source/measure delay.

The timing of measuring sensor EMF and sourcing current through the driver ISM was controlled with the Keithley 2612B sourcemeter. One of its channels acquired samples from the buffered output of the Keithley 6514 electrometer, and the other sourced current directly to the driver ISM. I programmed its operation using Lua scripts.

For every Ca²⁺-selective sensor, a three-point calibration was performed prior to its use in an experiment. In addition, drift corrections were performed in between continuous measurements. For the K⁺- and Na⁺-selective sensors, it was only possible to perform one-point calibrations before each experiment due to the fragility of the non-PVC ISMs. Instead, a single three-point calibration was performed for each of these formulations using the same stock.

In each run, the temporal evolution of ions was measured over 700 s, with current being applied across the driver ISM during the first 100 seconds. For each new sensor/driver pair, a sequence of these runs were carried out with increasing currents: −0.2 µA, 0.2 µA, −0.3 µA, 0.3 µA, −0.4 µA, 0.4 µA, −0.5 µA, and 0.5 µA.

Figures 28, 29, 30, 31:
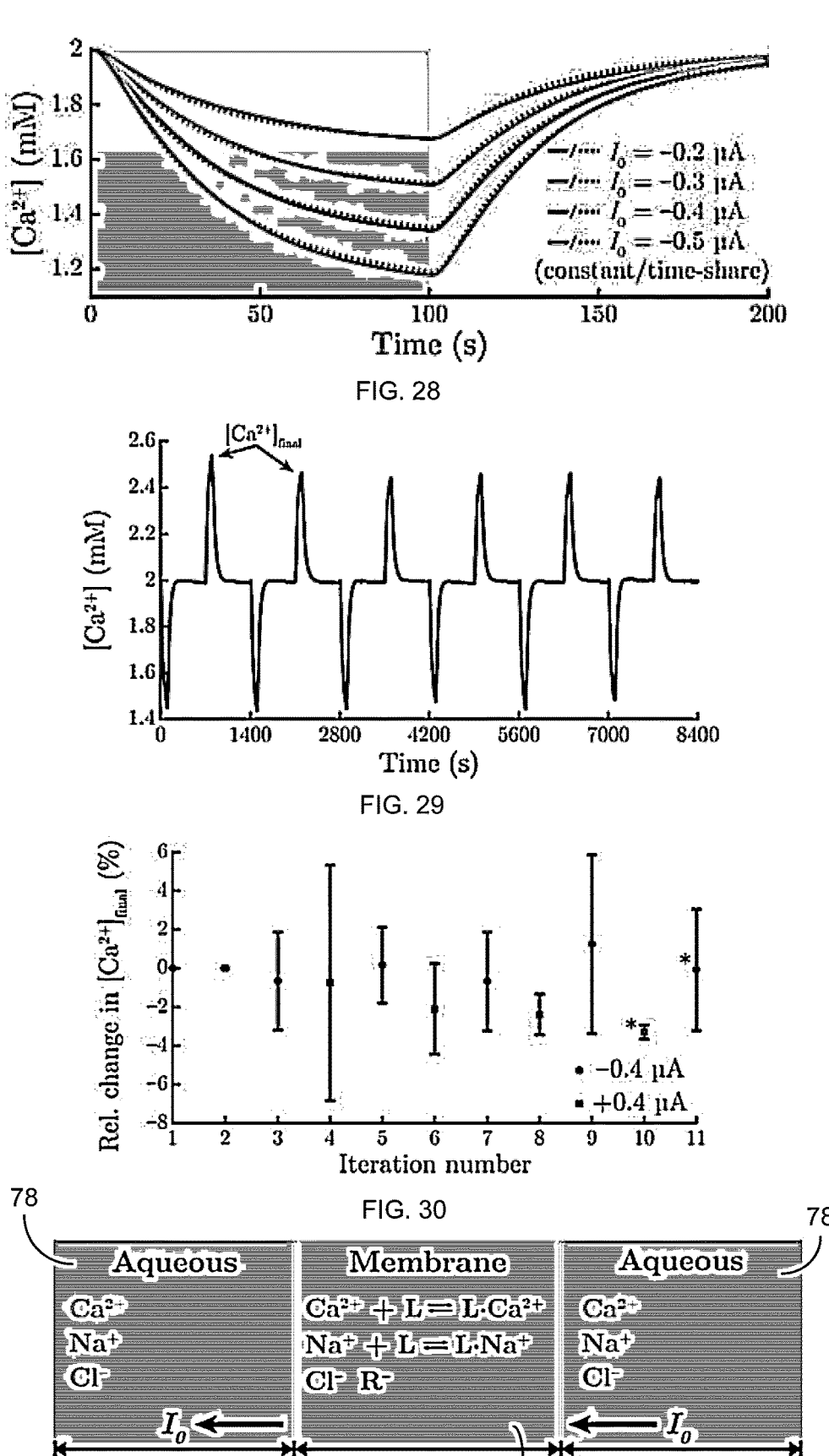
FIG. 28 provides a theoretical comparison of $Ca^{2+}$ measurements taken during constant galvanostatic polarization (solid lines) and time-sharing (dashed lines), with current applied in the first 100 seconds (based on numerical solutions to the 2-D axisymmetric model).
FIG. 29 is a plot of sequential direct concentration measurements for $\pm 0.4$ µA, iterated five times sequentially.
FIG. 30 is a plot of relative changes in the concentration of $Ca^{2+}$ at t=300 seconds for each sequential iteration, averaged over n=3 for iterations 1-8 and n=2 for iterations 10 and 11 (denoted as such by *).
FIG. 31 is a schematic illustration of model geometry for a physicochemical model of solute transport within a carrier-based liquid membrane system.

Direct concentration measurements are plotted in FIGS. 29 and 30 for ±0.4 µA, iterated five times sequentially. In FIG. 29, sequential measurements are plotted for one representative device. In FIG. 30, relative changes in the concentration of Ca²⁺ at t=300 seconds for each sequential iteration, averaged over n=3 for iterations 1-8 and n=2 for iterations 10 and 11 (denoted as such by *).

The temporal profile of the Ca²⁺ measurements remain highly consistent across successively applied iterations of 0.4 µA at negative and positive polarity. It appears that each run had an insignificant effect on the persistent transport characteristics of the driver ISM and that, within the conditions studied here, successive runs with the same driver/sensor pair remain largely unaffected by their antecedents.

For a 1-D geometry, the governing equations of Nernst-Planck-Poisson simulate concentration profiles that form in both the aqueous and membrane domains. These concentration boundary layers develop as a result of driving the flux of ions across domains with mismatched transport characteristics. The membrane, for instance carries the selected ion through the membrane at a much higher efficiency than the aqueous phases do. Because of this mismatch, electric current causes boundary layers of Ca²⁺ to form in the aqueous regions adjacent to the membrane. There is, likewise, a mismatch in the transport of membrane components, the carrier (driven by interfacial binding/unbinding) and mobile lipophilic counter-ion, as neither are present in substantive concentrations in the aqueous phase. Thus, the membrane components, in a manner similar to Ca²⁺ in the aqueous regions, form boundary layers in the interior of the membrane. These intra-membrane phenomena have previously been observed in experiments using the methodology of spectroelectrochemical microscopy (SpECM). On the other hand, we know of no existing work establishing the influence of these boundary layers on driven transport.

The model indicates that each process caused by aqueous and intra-membrane boundary layers, may dominate depending on the exact properties of the membrane. Critical properties include the membrane's diffusion and partition coefficients. The effect of each process intensifies as concentrations approach exhaustion at either boundary of the membrane. The time-scale varies for each effect, as does the boundary where it arises (relative to the polarity of current). According to this model, each process will reduce the transport selectivity of the membrane with respect to either interfering co-ions or counter-ions, given a sufficiently large current. For one of the given processes—that caused by the boundary layer of unbound carrier—the model indicates that the leaching of lipophilic counter-ion may occur. Altogether, the characteristics summarized in the Table, below, provide a means of distinguishing the effects of each process.

A physicochemical model of solute transport within a carrier-based liquid membrane system is presented in FIGS. 31-34. A schematic illustration of model geometry is provided in FIG. 31. Simulated concentration profiles of aqueous solute 78 and membrane-confined solute 80 during the application of constant current are plotted in FIGS. 32 and 33, with conditions, in FIG. 32, that give rise to the exhaustive depletion of unbound carrier within the membrane (default model parameters, J=−1 A/m²), and with conditions, in FIG. 33, that give rise to the exhaustive depletion of lipophilic counter-ion within the membrane $$\left(D_L^{(org)} = 2 \times 10^{-11}\,\mathrm{m}^2/\mathrm{s}, J = -1.5\,\mathrm{A}/\mathrm{m}^2\right).$$

The call-out of the plot of FIG. 33 shows the relative magnitudes of several key boundary processes that give rise to selective transport, normalized to their maximum values within the depicted region. FIG. 34 presents a schematic illustration of the experimental setup, including a reference electrode 34, a counter electrode are denoted as RE and CE respectively.

To determine, in praxis, the interplay between each of the processes, an experimental technique was developed that would allow detection of temporal changes in transport selectivity and leaching while driving current. As the test system, we used a plasticized polyvinyl-chloride matrix formulated with the ETH-129 Ca²⁺-selective ionophore and tetraphenylborate as the lipophilic counter-ion (alternatively, potassium tetrakis(4-chlorophenyl) borate, can be used). The membrane, having a final thickness of 100 µm, was inserted into the tip of a glass capillary measuring 0.86-mm inner diameter, and this electrode was immersed into electrolyte media containing 2-mM CaCl₂, 100-mM NaCl, 10-mM KCl, and 25-mM HEPES buffer, adjusted to 7.4 pH using NaOH, allowing it to equilibrate between 24-32 hours. Alternatively, some experiments were carried out with 0-mM KCl. During the experiment, constant electric current was applied through the membrane electrode; and, simultaneously, the concentrations Ca²⁺, Na⁺, or K⁺ in the aqueous diffusion boundary layer was directly measured. In addition, we used the system to monitor for the presence of lipophilic counter-ion in order to detect leaching.

This approach, related to scanning electrochemical microscopy (SECM), was to position a secondary, sensor membrane electrode within a fixed distance, 100 μm, from the external boundary of the original, driver membrane electrode. The sensor electrode, which was either $Na^+$-, $K^+$-, or $Ca^{2+}$-selective, operated by zero-current potentiometry. In order to prevent contamination in the sensor reading from the Ohmic drop created by the driver electrode, a technique was developed that ran on a similar principle as the discontinuous single-electrode voltage clamp used in electrophysiological studies-we operated the driver and sensors electrodes on a time-share basis. Repetitively, under instrument control, the driver electrode would be switched off to allow the sensor membrane to take a measurement. By adjusting the ratio between the source (current-on) interval and the total period between measurements to 91%, we demonstrate that there are no projected differences between its effect and that of constant galvanostatic current.

TABLE

Comparison of membrane-bound limiting processes for a carrier-based liquid membrane whose targeted ion is positively charged:

| Boundary processes | Predicted outcome under intensive current | Time-scale* | Boundary of depletion | Mechanism |
|---|---|---|---|---|
| Diffusion of carrier | Loss of transfer selectivity for targeted ion Leaching of mobile lipophilic counter-ion | ~$10^3$ s | Current entering | Relaxation of interfacial boundary potential |
| Electrodiffusion of mobile lipophilic counter-ion | Loss of transfer selectivity for cations | ~$10^3$ s | Current exiting | Loss of Donnan co-ion exclusion |
| Electrodiffusion of aqueous ions | Loss of transfer selectivity for targeted ion | ~$10^1$ s | Current entering | Competitive binding of interfering ions |
| Reaction kinetics | Loss of transfer selectivity for targeted ion | ~$10^{-11}$ s | Current entering | Accumulation of unbound ions |

*To equilibrium, based on the parameters of the membrane. The time to depletion may be much shorter if a sufficiently large electric current is applied.

There is a close relationship between the aqueous concentration of ions, which I measured in my study, and their respective transport selectivity. In the case of minority carries, such as $Ca^{2+}$ and $K^+$ in this system, their aqueous concentrations vary linearly with their integral transferences. According to this principle, this study was able to monitor for changes in the transport selectivities of $Ca^{2+}$, $Na^+$, and $K^+$.

These sensors, simultaneously, were able to detect the presence of tetraphenylborate anions. Having the same basic constitutive elements as the driver membrane, the membrane phase of each sensor had a high affinity for the lipophilic counter-ion. Therefore, without requiring any explicit carriers, the presence of tetraphenylborate in the aqueous phase induces a robust negative polarity on the sensor reading. The change in sensor reading caused by tetraphenylborate can be discriminated from that caused by the other ions using three criteria: (1) by considering the temporal evolution of the sensor reading—a sudden and massive shift in the sensor towards negative polarity indicates the presence of tetraphenylborate, especially when it occurs after the system reaches an initial steady-state and to an extent infeasible for any other ion; (2) by evaluating the effect of aqueous $K^+$ on the response—as tetraphenylborate forms complexes with $K^+$ in aqueous media, its contribution to the sensor reading would change depending on the presence or absence of $K^+$; and (3) by considering the direction of the applied current—as a negatively charged ion, electric current would drive tetraphenylborate towards the sensor under negative polarity and away from the sensor under positive polarity. Therefore, using my technique, we could measure the two crucial outcomes of membrane limiting: selectivity and the leaching of lipophilic counter-ion.

In the experiments with 10-mM KCl, we observed consistent and repeatable modulation of $Ca^{2+}$ ion concentration that conformed to modelling predictions. As demonstrated, the concentration varied directly with the applied current, both cathodic and anodic in polarity. At the same time, measurements of $K^+$ and $Na^+$ taken under the same conditions showed a much lesser change amidst the application of current. In contrast with the $Ca^{2+}$ measurements, the changes in concentrations of these interfering ions related inversely with the applied current. This relationship establishes that the aqueous transferences of the interfering ions exceeded their transferences in the membrane. Altogether, these results indicate that the membrane carried $Ca^{2+}$ through the membrane with near-equilibrium selectivity.

Direct concentration measurements of aqueous ions measured 100 μm from the surface of the driver membrane are plotted in FIGS. 35-38. The temporal profile of the $Ca^{2+}$ concentration during applied current, and subsequently, its return to equilibrium is plotted in FIG. 35. The final concentrations of $Ca^{2+}$, $K^+$, and $Na^+$ measured at 100 seconds are plotted in FIGS. 36-38, respectively, where the dotted line shows the concentrations simulated under the Nernst-Planck-Poisson transport model.

We could apply a current of –0.5 μA for at least 100 seconds without observing any deviation from ideal, near-equilibrium transport. However, beyond this point, we see clear deviations in the sensor's boundary potential, after applying a current of –0.6 μA, the boundary potential transitioned sharply in the negative direction at 100 seconds and then trailed off from the cessation of current. Meanwhile, under positive polarity of current at the same magnitude, we observed no such deviations. These features also arose during my measurements of $Na^+$ and $K^+$, displaying identical characteristics. Considering the previously outline criteria, these factors each point strongly towards the leaching of tetraphenylborate from the driver electrode as the source of this outcome.

In order to investigate further the onset of leaching in my experiments, we repeated the $Ca^{2+}$ measurements in the absence of $K^+$. Under conditions of 0-mM KCl in the bath electrolyte, we detected tetraphenylborate much earlier-after applying currents of only –0.4 μA for 100 seconds. The presence of $K^+$ clearly had an effect on the ions detected by the sensors, despite the fact that the concentration of $K^+$ itself remained nearly constant during the experiments in which it was present. A well-known and often-exploited interaction, tetraphenylborate forms ion pairs with $K^+$ in aqueous media. These results agree with the intuition that ion pairing would reduce the availability of free tetraphenylborate and effectively limit its transport in the aqueous phase. Thus, the effect of changing the bath KCl concentration provides additional confirmation that the driver electrode released tetraphenylborate during electrical polarization.

Raw sensor readings from the $Ca^{2+}$-selective sensor taken for a range of currents, demonstrating conditions that give rise to tetraphenylborate leaching, are plotted in FIG. 39. The solid lines show measurements taken with 10-mM K$^+$ present, and the faded lines show measurements taken with 0-mM KCl.

The available evidence indicates that the leaching of tetraphenylborate can be attributed to the free ionophore boundary layer. The influence of the aqueous boundary layer is not feasible, as I maintained all currents across the tetraphenylborate-containing membrane well within the limiting current, $J^{lim,Ca^{2+}}=-1.23$ A/m$^2$. In addition, we can disregard the reaction boundary layer; conflicting with the observations that leaching occurred on the time-scale of 100 seconds, the effects of the reaction boundary layer would arise nearly instantaneously. Between the lipophilic counter-ion and free ionophore boundary layers, only the later agrees with the observations that the non-ideal behavior occurs only under negative polarity and not under positive polarity. Finally, the free ionophore boundary layer is the only process that my model predicts can lead to the leaching of tetraphenylborate. We conclude that the free ionophore boundary layer had a clear effect on the transport characteristics of the system, that it caused leaching of tetraphenylborate. Furthermore, we conclude that it dominated over the other processes listed in the Table, above, in the sense that it set the most restrictive limit on the currents that can be applied while maintaining ideal operation.

Raw sensor readings from the Ca$^{2+}$-selective sensor taken for a current of −0.4 µA are plotted in FIG. 40, with the numerical solution describing the underlying processes giving rise to its trend.

As the leaching of tetraphenylborate from the membrane poses a significant threat to the practical operation of the membrane, I next explored an approach for mitigating it. For another set of experiments, we replaced tetraphenylborate with tetrakis(4-chlorophenyl)borate as the membrane's lipophilic counter-ion. The lipophilicity, quantified by the partition coefficient, of tetrakis(4-chlorophenyl)borate is an order of magnitude greater than that of tetraphenylborate, and this property has been shown to improve the lifetime of membrane sensors under zero-current conditions. While the tetraphenylborate membrane could only sustain up to −0.5 µA without leaching within 100 seconds, we observed no leaching of the tetrakis(4-chlorophenyl)borate membrane under any of the conditions tested, with currents up to −0.8 µA. Neither did we observe any leaching under these conditions after removing KCl from the bath electrolyte. Therefore, choosing a sufficiently lipophilic counter-ion, such as tetrakis(4-chlorophenyl)borate in this case, can be a key consideration for designing selective membrane systems with electrically driven transport.

Direct concentration measurements of Ca$^{2+}$ concentration measured 100 µm from the surface of the driver membrane which contained tetrakis(4-chloro)phenylborate are plotted in FIG. 41.

In conclusion, we detected leaching of a lipophilic counter-ion in its respective membrane under increasing levels of current, and the results indicate that the leaching arose from the intra-membrane diffusion boundary layer of unbound carrier. We determined a strategy for eliminating leaching, replacing the lipophilic counter-ion with another of greater lipophilicity, and this allowed us to increase the current up to the aqueous limit without observing any leaching. Approaching the aqueous limiting current with the improved membrane, we found preliminary evidence for over-limiting behavior.

The leaching of lipophilic counter-ion and loss of transfer selectivity are fundamental to the operation of the membrane. Both will result in loss of function and leaching potentially introduces toxic solutes into the aqueous solution. Not only are these critical behaviors relevant for ion-tronic platforms, but also for selective removal/recovery applications. The source-measurement time-sharing technique provides an effective means of studying adverse processes, such as these. Furthermore, the technique offers a new method of studying general boundary-layer phenomena that arise not just in membranes, but also at electrodes during their polarization.

These perspectives, crucial to the operation of carrier-based liquid membranes, are necessary for the realization of membranes with general single-ion selectivity. Still in an early stage of development, these technologies offer new solutions for selective removal/recovery of ions and delivery of chemicals in biological systems.

In describing embodiments, herein, specific terminology is used for the sake of clarity. For the purpose of description, specific terms are intended to at least include technical and functional equivalents that operate in a similar manner to accomplish a similar result. Additionally, in some instances where a particular embodiment includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Further still, where methods are recited and where steps/stages are recited in a particular order—with or without sequenced prefacing characters added for ease of reference—the steps/stages are not to be interpreted as being temporally limited to the order in which they are recited unless otherwise specified or implied by the terms and phrasing.

While this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention.

What is claimed is:

1. A prosthetic device comprising a closed loop system for maintaining a predetermined concentration of a target ion in a region in proximity to a cell, the device comprising:
  a controller; and
  an ion-selective electrode assembly operatively connected to the controller, wherein the ion-selective electrode assembly is configured to sense the concentration of the target ion by potentiometric measurement and to convey the concentration to the controller, wherein
  the controller is configured to repeat a sequence of using the ion-selective electrode assembly to (a) sense the concentration of the target ion and (b) modulate application of current to the ion-selective electrode assembly based on the sensed concentration of the target ion to control the concentration of the target ion so as to maintain the predetermined concentration of the target ion in the closed-loop system, wherein the controller is further configured to operate a feedback system including the ion-selective electrode assembly that both senses, via potentiometric measurement, and modulates, via applied electric field, the concentration of the target ion by repeatedly: (i) shutting off the current during short intervals to take a potentiometric measurement of the target ion concentration, and (ii) determining, using a mathematical model updated based on the measured target ion concentration, the magnitude of electric field to apply to maintain the predetermined concentration of the target ion and applying the electric field of the determined magnitude through the ion-selective electrode assembly.

2. The prosthetic device of claim 1, wherein the ion-selective electrode assembly comprises:
  a first ion-selective electrode that is configured to sense the concentration of the target ion; and
  a second ion-selective electrode that is configured to control the concentration of the target ion via the modulation of the current by the controller.

3. The prosthetic device of claim 1, wherein the ion-selective electrode assembly comprises a single ion-selective electrode configured both (a) to sense the concentration of the target ion and (b) to control the concentration of the target ion via the modulation of the current by the controller.

4. The prosthetic device of claim 1, further comprising a power source configured to supply a voltage to the ion-selective electrode assembly.

5. The prosthetic device of claim 4, wherein the power source is configured to supply DC electrical current to the ion-selective electrode assembly.

6. The prosthetic device of claim 4, wherein the ion-selective electrode assembly is implanted in a subject sufficiently close to a nerve in the subject to change the concentration of ions at the nerve when voltage from the power source is delivered to the ion-selective electrode assembly.

7. The prosthetic device of claim 1, wherein the ion-selective electrode assembly comprises an electrode core coated with an ion-selective membrane, wherein the composition of the ion-selective membrane is tailored such that the membrane loses transfer selectivity at the predetermined concentration, thereby maintaining the predetermined concentration of the target ion.

8. The prosthetic device of claim 7, wherein the target ion is $Ca^{2+}$ and the ion-selective membrane is a $Ca^{2+}$-selective membrane.

9. The prosthetic device of claim 7, wherein the target ion is $Na^+$ and the ion-selective membrane is a $Na^+$-selective membrane.

10. The prosthetic device of claim 7, wherein the target ion is $K^+$ and the ion-selective membrane is a $K^+$-selective membrane.

11. The prosthetic device of claim 7, wherein the electrode core is less than 1 mm in diameter.

12. The prosthetic device of claim 1, wherein the ion-selective electrode assembly is deposited on a flexible biocompatible substrate.

13. The prosthetic device of claim 1, wherein the prosthetic device is sized to enclose a nerve.

14. The prosthetic device of claim 1, wherein the ion-selective electrode assembly comprises a porous electrode layer sandwiched between a first and second membrane wherein the first membrane is an electrochemical diode and the second membrane is selected from an electrochemical diode and an ion-selective membrane (ISM) operably connectable to a power supply.

15. The prosthetic device of claim 14, wherein the electrochemical diode is a bipolar ion-exchange membrane.

16. The prosthetic device of claim 14, wherein the prosthetic device is further configured for electrochemical rectification.

17. A method of modulating neural activity in a subject in need thereof, comprising:
  implanting the ion-selective electrode assembly of the prosthetic device of claim 1 sufficiently proximate to a nerve cell in a subject to deliver electrical current to the nerve cell;
  applying an electrical current through the ion-selective electrode assembly to deliver that electrical current to the nerve cell; and
  repeatedly (i) shutting off the current during short intervals to take potentiometric measurements of the target ion concentration using the ion-selective electrode assembly, and (ii) determining, using the mathematical model updated based on the measured concentration, the magnitude of electric field to apply to maintain the predetermined concentration of the target ion, and issuing a command to apply the electric field of the determined magnitude through the ion-selective electrode assembly in the closed-loop system.

18. The method of claim 17, wherein the ion-selective electrode assembly comprises an electrode core coated with an ion-selective membrane, wherein the composition of the ion-selective membrane is tailored such that the membrane loses transfer selectivity at the predetermined concentration, thereby maintaining the predetermined concentration of the target ion.

19. The method of claim 18, wherein the electrical current delivered to the nerve cell is less than 1 uA.

20. The method of claim 18, wherein the electric field applied to the ion-selective electrode assembly is less than 2V.

21. The method of claim 18, wherein the subject is in need of treatment of a neurological disease or condition.

22. The method of claim 21, wherein the neurological disease or condition is selected from the group consisting of epilepsy, chronic pain, Parkinson's disease and other movement disorders.

23. The method of claim 21, wherein the neurological condition is a neuropathic pain disorder.

24. The method of claim 23, wherein the neuropathic pain disorder is Trigeminal Neuralgia.

25. The method of claim 21, wherein the modulation is selected from stimulation or inhibition of nerve signal propagation.

26. The method of claim 18, wherein the ion-selective membrane offers single-ion selectivity, passing the target ion while blocking all other ions, and wherein the target ion is $Ca^{2+}$, $Na^+$, or $K^+$.

27. The method of claim 26, wherein the ion-selective membrane separates the target ion from other ions of identical charge.

28. The method of claim 17, wherein the prosthetic device is in the form of a cuff, and wherein the cuff is wrapped around the nerve cell in vivo.

\* \* \* \* \*